US012092019B2

(12) United States Patent
Matsuda

(10) Patent No.: US 12,092,019 B2
(45) Date of Patent: Sep. 17, 2024

(54) POWER DEVICE, AND PROPULSION DEVICE FOR MOVEMENT

(71) Applicant: KAWASAKI MOTORS, LTD., Hyogo (JP)

(72) Inventor: Yoshimoto Matsuda, Kobe (JP)

(73) Assignee: KAWASAKI MOTORS, LTD, Hyogo (JP)

(*) Notice: Subject to any disclaimer, the term of this patent is extended or adjusted under 35 U.S.C. 154(b) by 0 days.

(21) Appl. No.: 18/229,284

(22) Filed: Aug. 2, 2023

(65) Prior Publication Data

US 2023/0374934 A1 Nov. 23, 2023

Related U.S. Application Data

(63) Continuation-in-part of application No. PCT/JP2021/004725, filed on Feb. 9, 2021.

(51) Int. Cl.
F02B 39/10 (2006.01)
F01M 1/02 (2006.01)
F02B 75/32 (2006.01)
F02B 75/18 (2006.01)

(52) U.S. Cl.
CPC ............ *F02B 39/10* (2013.01); *F01M 1/02* (2013.01); *F02B 75/32* (2013.01); *F02B 2075/1816* (2013.01)

(58) Field of Classification Search
CPC .. F02B 39/10; F02B 75/32; F02B 2075/1816; F02B 61/00; F02B 67/00; F02B 77/00; F01M 1/02; F01M 11/00; B64U 10/14; B64U 50/11; B64U 30/20; F16F 15/26

USPC .... 123/2, 192.1, 192.2, 197.3, 197.4, 198 C, 123/198 E; 701/3
See application file for complete search history.

(56) References Cited

U.S. PATENT DOCUMENTS

| 8,418,669 B2* | 4/2013 | Katayama ............ F16F 15/265 123/192.1 |
|---|---|---|
| 10,570,788 B2* | 2/2020 | Bennett .............. F01M 11/0004 |
| 11,333,051 B2* | 5/2022 | Owaki ............... F01M 11/0004 |
| 11,358,461 B2* | 6/2022 | Matsuda .................. B60K 6/24 |
| 2010/0065014 A1 | 3/2010 | Dos Santos et al. |
| 2011/0209680 A1 | 9/2011 | Katayama et al. |
| 2017/0226925 A1* | 8/2017 | Laimboeck .............. B60K 6/24 |
| 2018/0134384 A1* | 5/2018 | Ichihara ................. B64D 37/02 |

(Continued)

FOREIGN PATENT DOCUMENTS

| JP | 59-159711 | 10/1984 |
| JP | 61-166108 | 10/1986 |
| JP | 6-221181 | 8/1994 |

(Continued)

OTHER PUBLICATIONS

International Preliminary Report on Patentability issued Aug. 15, 2023 in International (PCT) Application No. PCT/JP2021/004725 with English-language translation.

*Primary Examiner* — Hai H Huynh
(74) *Attorney, Agent, or Firm* — WENDEROTH, LIND & PONACK, L.L.P.

(57) ABSTRACT

A power device includes: a plurality of shafts; and a case that rotatably supports the plurality of shafts. At least one of the plurality of shafts has a protruding end portion protruding outward from the case at least at one end portion in an axial direction. An output unit capable of rotationally driving a driven device is at the protruding end portion.

20 Claims, 10 Drawing Sheets

(56) References Cited

U.S. PATENT DOCUMENTS

2020/0079204 A1 3/2020 Matsuda
2021/0016880 A1* 1/2021 Ishikawa ............... F02B 75/282

FOREIGN PATENT DOCUMENTS

| JP | 2010-509536 | 3/2010 |
| JP | 2011-163252 | 8/2011 |
| JP | 2015/075538 | 5/2015 |
| JP | 2015-101198 | 6/2015 |
| JP | 2015-137092 | 7/2015 |
| JP | 2017-120036 | 7/2017 |
| JP | 2020-41481 | 3/2020 |
| JP | 2020-073379 | 5/2020 |

* cited by examiner

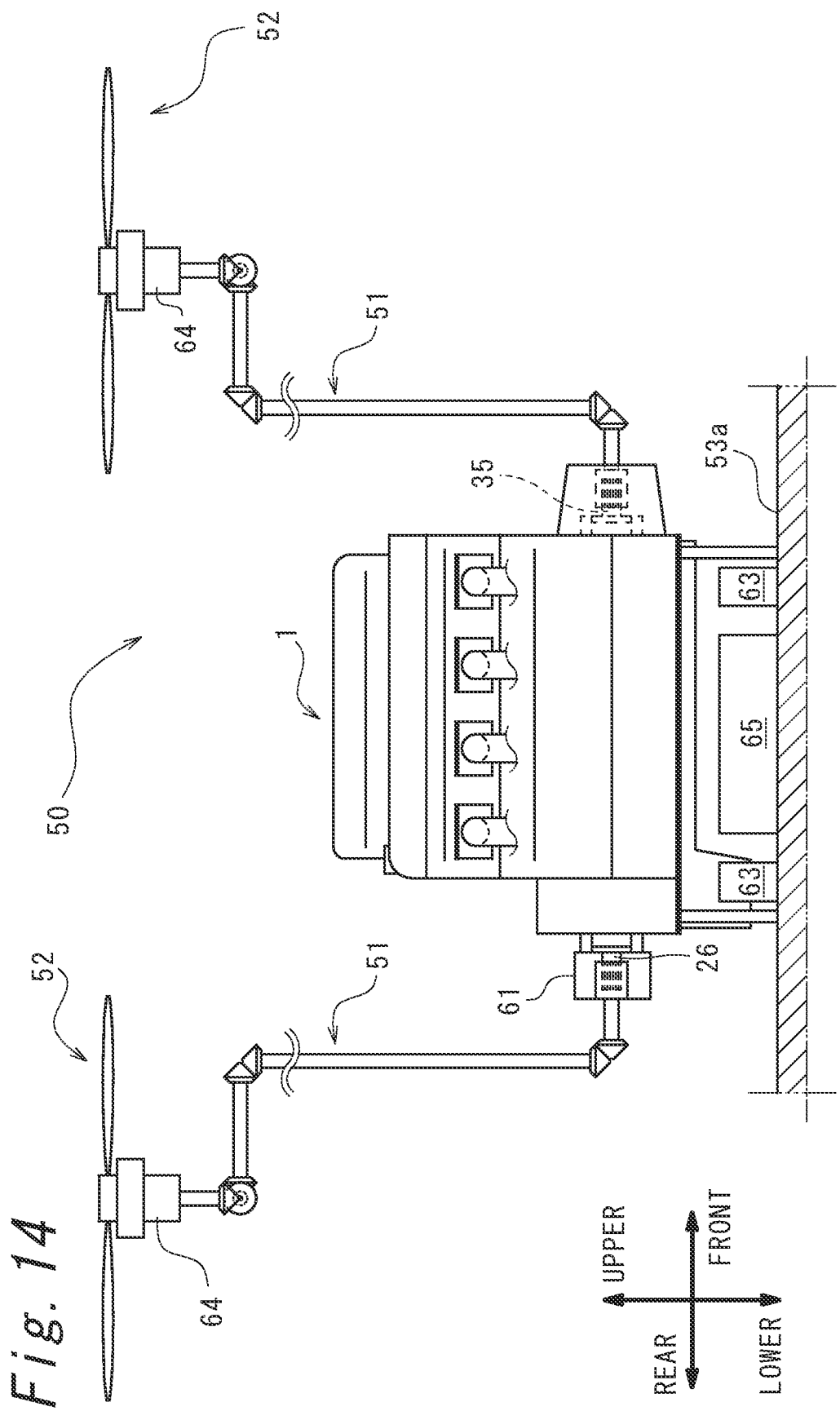

POWER DEVICE, AND PROPULSION DEVICE FOR MOVEMENT

CROSS-REFERENCE TO RELATED APPLICATIONS

This is a national phase application in the U.S. of International Patent Application No. PCT/JP2021/004725 with an international filing date of Feb. 9, 2021, the contents of which are incorporated herein by reference.

TECHNICAL FIELD

The present disclosure relates to a power device, and a propulsion device for movement.

BACKGROUND ART

JP-A-2015-137092 discloses a power device (internal combustion engine) mounted on a flying body as a power source. In this power device, a first propeller is connected to one end portion of a crankshaft, and a generator for generating electricity for driving a second propeller by a motor is connected to the other end portion.

SUMMARY OF THE INVENTION

Problems to be Solved by the Invention

The power device of JP-A-2015-137092 has a structure in which the first propeller is mechanically driven at one end portion of the crankshaft, and it is necessary to form a flying body according to a power take-off position (a shaft end of a crank), and versatility is low.

An object of the present disclosure is to provide a power device with improved versatility and a propulsion device for movement including the power device.

Solutions to the Problems

The present disclosure provides a power device which includes:
 a plurality of shafts; and
 a case that rotatably supports the plurality of shafts,
 in which each of the plurality of shafts has a protruding end portion protruding outward from the case at least at one end portion in an axial direction, and
 an output unit capable of rotationally driving a driven device is configured at the protruding end portion.

According to the present disclosure, since the power device includes a plurality of the output units, it is possible to increase the degree of freedom of an arrangement of the power device according to the arrangement of the driven device. For example, the output units to be used can be selected in accordance with the layout of the driven device at a mounting location on which the power device is mounted so that the drive path from the output units to the driven device is improved in efficiency or simplified. Furthermore, for example, a generator is driven by a part of the plurality of output units, and the mechanical power is easily optimized to be extracted from the remaining output units. Therefore, since the power device can be used for various applications, versatility can be enhanced.

Another aspect of the present disclosure provides a propulsion device for movement, the propulsion device including:
 the above-described power device;
 one or a plurality of drive units for movement;
 one or a plurality of generators constituting one or a plurality of the driven devices;
 a power storage device that stores electricity generated by the one or plurality of generators; and
 one or a plurality of electric motors that are rotationally driven by electricity supplied from the power storage device,
 in which the one or plurality of drive units for movement include at least one of a first drive unit for movement that constitutes the one or plurality of driven devices, is mechanically connected to the output units, and is rotationally driven, and a second drive unit for movement that is rotationally driven by the electric motors.

According to the disclosure, the drive unit for movement can be mechanically rotationally driven by one or more of the plurality of outputs and/or rotationally driven by one or more electric motors. As a result, the versatility of a drive source for driving the drive unit for movement can be easily enhanced, and the versatility of the propulsion device for movement can be enhanced.

Note that, in the present specification, the drive unit for movement means a unit driven for movement in a moving body, and corresponds to, for example, a wheel in the case of a vehicle and a propeller in the case of a flying body.

Effects of the Invention

According to the present disclosure, versatility of the power device and the propulsion device for movement can be enhanced.

BRIEF DESCRIPTION OF THE DRAWINGS

FIG. 14 is a side view schematically illustrating a flying body according to another modification example.

DETAILED DESCRIPTION

First Embodiment

Figure 1:
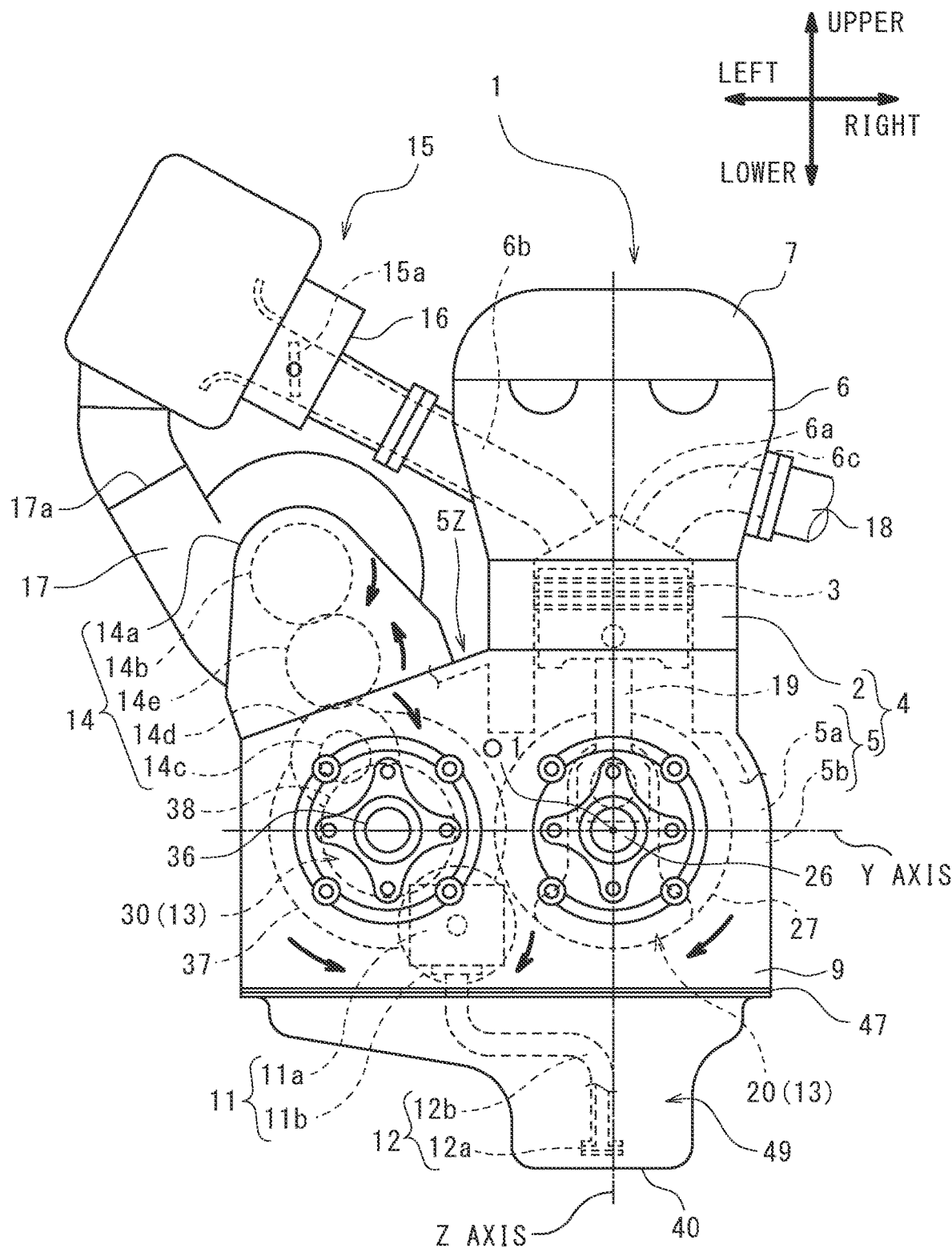
FIG. 1 is a rear view of an engine according to a first embodiment of the present disclosure.
Figure 2:
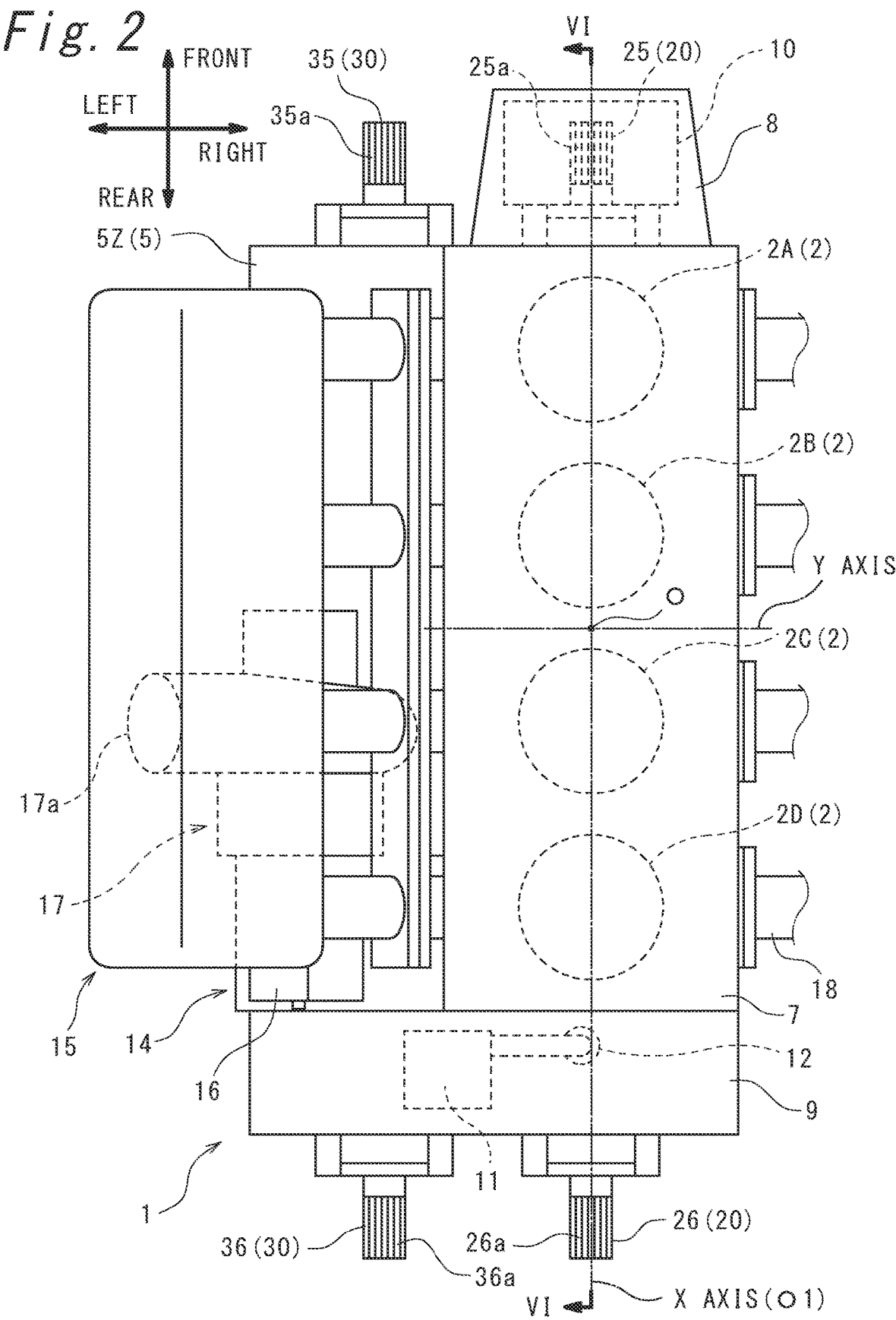
FIG. 2 is a top view of the engine of FIG. 1.

An engine 1 (power device) according to a first embodiment of the present disclosure will be described with reference to FIGS. 1 to 8. FIG. 1 is a rear view of the engine 1 as viewed from an axial direction of a crankshaft 20, and FIG. 2 is a top view of the engine 1. As illustrated in FIGS. 1 and 2, in the present embodiment, the engine 1 is an internal combustion engine, and is a four-cycle in-line four-cylinder engine having four cylinders 2 in series. However, the combustion method of the internal combustion engine may be two cycles or a diesel engine. Furthermore, the number of cylinders is not limited to the number of the present embodiment.

In the following description, a direction in which a central axis O1 of the crankshaft 20 extends is referred to as a front-and-rear direction of the engine 1, a direction orthogonal to the front-and-rear direction and extending in a horizontal direction is referred to as a left-and-right direction of the engine, and a vertical direction is referred to as an up-and-down direction of the engine 1. Specifically, an upper side in FIG. 2 is referred to as a front side, a lower side in FIG. 2 is referred to as a rear side, a left side in FIG. 2 is referred to as a left side, and a right side in FIG. 2 is referred to as a right side. Furthermore, the four cylinders 2 are referred to as a first cylinder 2A, a second cylinder 2B, a third cylinder 2C, and a fourth cylinder 2D in order from the front. However, the notation of the front and rear, and left and right in the present embodiment is a definition for convenience, and for example, when the present disclosure is mounted on a moving body, the front, rear, left, and right directions of the present disclosure may not coincide with front, rear, left, and right directions of the moving body.

Furthermore, an intermediate position in the front-and-rear direction between the second cylinder 2B and the third cylinder 2C on the central axis O1 is referred to as an origin O, the central axis O1 is referred to as an X axis, an axis passing through the origin O and extending in the left-and-right direction is referred to as a Y axis, and an axis passing through the origin O and extending in the up-and-down direction is referred to as a Z axis.

As illustrated in FIG. 1, the engine 1 includes an oil pan 40, a cylinder block 4, a cylinder head 6, and a cylinder head cover 7 in order from below. In the cylinder block 4, the four cylinders 2 positioned in an upper half and a crankcase 5 positioned in a lower half are integrally formed. The crankcase 5 has a crankcase protrusion 5Z protruding to the left with respect to the cylinder 2.

The crankcase 5 is vertically divided into two parts by an upper crankcase 5a located on the upper side and a lower crankcase 5b located on the lower side. The crankshaft 20 (first shaft) and a balancer shaft 30 (second shaft) are rotatably supported between the upper crankcase 5a and the lower crankcase 5b. The central axis of the cylinder 2 extends in the vertical direction, and the crankshaft 20 is located immediately below the cylinder 2. The balancer shaft 30 is located inside the crankcase protrusion 5Z.

The cylinder head 6 includes an intake port 6b that extends leftward from a combustion chamber 6a and opens to a left side surface, and an exhaust port 6c that extends rightward from the combustion chamber 6a and opens to a right side surface. In the cylinder head 6, an intake pipe 15 is connected to the intake port 6b on the left side surface, and an exhaust pipe 18 is connected to the exhaust port 6c on the right side surface.

The intake pipe 15 is provided with a throttle valve 15a and a throttle body 16 that electronically controls an opening of the throttle valve 15a. Note that the throttle body 16 may be configured to mechanically adjust an opening degree of the throttle valve 15a via a wire according to a depression operation amount of an accelerator pedal (not illustrated).

Furthermore, a supercharger 17 is disposed below the intake pipe 15. The supercharger 17 is fixed to an upper portion of the crankcase protrusion 5Z, and a discharge port 17a is connected to an upstream end portion of the intake pipe 15. The air discharged from the supercharger 17 is supplied to the intake pipe 15, a flow rate of the air is adjusted by the throttle body 16, and then the air is introduced into the combustion chamber 6a via the intake port 6b. Furthermore, the air supplied to the combustion chamber 6a is combusted together with fuel to become combustion gas, and is discharged from the combustion chamber 6a via the exhaust port 6c and the exhaust pipe 18. Note that, in the engine 1, the supercharger 17 is not essential, but for example, in a case where the engine 1 is used as a power source of a flying body moving at a high altitude, it is preferable to include a supercharger in order to compensate for low air density at the high altitude.

As illustrated in FIG. 2, a front case 8 is attached to a front surface of the crankcase 5, and a rear case 9 is attached to a rear surface of the crankcase 5. Specifically, the front case 8 is provided at a position corresponding to a right half of the front end surface of the crankcase 5, more specifically, a front side of the crankshaft 20, and at least a front end portion of the crankshaft 20 is covered with the front case 8 from the front side, the up-and-down direction, and the left-and-right direction. The rear case 9 is provided at a position corresponding to the rear side of both the crankshaft 20 and the balancer shaft 30. An oil pump 11 that sucks oil in the oil pan 40 and discharges the oil to each sliding portion in the engine 1 is disposed inside the rear case 9.

As illustrated in FIG. 1, the crankshaft 20 includes a crankshaft drive gear 27 provided concentrically with the central axis O1. The balancer shaft 30 extends in parallel to the crankshaft 20 (that is, in the front-and-rear direction) at a position adjacent to the crankshaft 20 on the left side, and includes a balancer shaft driven gear 37 that always meshes with the crankshaft drive gear 27. The crankshaft drive gear 27 and the balancer shaft driven gear 37 have the same outer diameter and the same number of teeth. Therefore, the balancer shaft 30 is rotationally driven by the crankshaft 20 and rotates in an opposite direction at the same rotation speed as the crankshaft 20.

The balancer shaft 30 includes a balancer shaft drive gear 38 for extracting a driving force for rotationally driving the oil pump 11 and the supercharger 17. The oil pump 11 includes a pump body 11a that pressure-feeds oil, and a pump driven gear 11b connected to the pump body 11a. The pump driven gear 11b always meshes with the balancer shaft drive gear 38. Therefore, the oil pump 11 is rotationally driven by the balancer shaft 30 via the balancer shaft drive gear 38 and the pump driven gear 11b to pressure-feed the oil.

The engine 1 further includes a supercharger drive mechanism 14 that rotationally drives the supercharger 17. The supercharger drive mechanism 14 includes a case 14a, a drive gear 14b for driving the supercharger, a driven gear 14c for driving the supercharger, a first intermediate gear 14d, and a second intermediate gear 14e. The case 14a is adjacent to the rear side of the supercharger 17 and is disposed above the crankcase protrusion 5Z. The drive gear 14b for driving the supercharger and the second intermediate gear 14e are rotatably supported inside the case 14a.

The driven gear 14c for driving the supercharger and the first intermediate gear 14d are rotatably supported in the crankcase 5. The driven gear 14c for driving the supercharger always meshes with the balancer shaft drive gear 38. The first intermediate gear 14d is configured to rotate concentrically and integrally with the driven gear 14c for driving the supercharger. The second intermediate gear 14e always meshes with both the first intermediate gear 14d and the drive gear 14b for driving the supercharger.

Therefore, when the balancer shaft 30 rotates, the driven gear 14c for driving the supercharger is rotationally driven via the balancer shaft drive gear 38, and as a result, the drive gear 14b for driving the supercharger is rotationally driven via the first intermediate gear 14d and the second intermediate gear 14e. The drive gear 14b for driving the supercharger is connected to an input shaft of the supercharger 17 so as to be able to transmit a driving force, and the supercharger 17 is rotationally driven by the drive gear 14b for driving the supercharger. The outer diameter and the number of teeth of each of the gears 14b to 14e are configured such that the supercharger 17 is rotationally driven at a speed higher than a rotation speed of the balancer shaft 30.

As illustrated in FIG. 2, the crankshaft 20 and the balancer shaft 30 respectively include front protruding end portions 25 and 35 protruding forward from the front end surface of the crankcase 5 at the front end, and rear protruding end portions 26 and 36 protruding backward from the rear end surface of the rear case 9 at the rear end. In other words, since the crankshaft 20 and the balancer shaft 30 extend in the front-and-rear direction in parallel with each other and overlap each other when viewed from the Y-axis direction, the engine 1 can be made compact in the front-and-rear direction. As described above, in the present embodiment, the crankshaft 20 and the balancer shaft 30 are configured to rotate in opposite directions, but may be configured to rotate in the same direction by interposing a gear therebetween or transmitting rotation by an endless body such as a chain.

Note that, in the present embodiment, the crankshaft 20 and the balancer shaft 30 include the front protruding end portions 25 and 35 and the rear protruding end portions 26 and 36 at both ends in the axial direction, but the crankshaft 20 and the balancer shaft 30 may each include the front protruding end portions 25 and 35 or the rear protruding end portions 26 and 36 at least at one end. For example, the present disclosure also includes a mode in which the crankshaft 20 include only the rear protruding end portion 26 and the balancer shaft 30 include only the rear protruding end portion 36. In short, the engine 1 only needs to be configured to include a plurality of power extraction portions, and the number and relative position of each protruding end portion are not limited.

Note that at least a part of each of the crankshaft 20 and the balancer shaft 30 may overlap with each other when viewed from a direction orthogonal to the central axis O1 of the crankshaft 20. In other words, an imaginary line that intersects with the central axis O1 of the crankshaft 20 and extends in the crankcase 5 in a direction orthogonal to the crankshaft 20 intersects with the balancer shaft 30. As a result, the layout of the crankshaft 20 and the balancer shaft 30 in the crankcase 5 can be easily made compact.

A plurality of spline grooves 25a, 35a, 26a, and 36a extending in the front-and-rear direction are provided over the entire outer peripheral surfaces of the front protruding end portions 25 and 35 and the rear protruding end portions 26 and 36. Each of the spline grooves 25a, 35a, 26a and 36a is configured so that a driven device is connected to each of the spline grooves 25a, 35a, 26a, and 36a by spline engagement, and constitutes an output unit that rotationally drives the driven device. Note that the connection of the driven device at each of the front protruding end portions 25 and 35 and the rear protruding end portions 26 and 36 is not limited to the spline engagement, and various types of joining such as flange joining may be adopted.

In the present embodiment, an engine generator 10 is connected to the front protruding end portion 25 of the crankshaft 20. The engine generator 10 is rotationally driven by the crankshaft 20 to generate power. The electricity generated by the engine generator 10 is used for an operation of the engine 1. The engine 1 is operated by operating, for example, a fuel injection injector, an ignition plug, various sensors, the throttle body 16, and the like using generated electricity via a controller (not illustrated). Note that in the present embodiment, the engine generator 10 is also covered with the front case 8 from the front side, the up-and-down direction, and the left-and-right direction. The front case 8 also functions as a protective member for protecting the engine generator 10.

Note that the output unit in the present disclosure means an output unit that is capable of mechanically and directly rotating a driven device excluding the engine generator 10 that generates electricity for operating the engine 1, that is, a generator that generates electricity for operating a device (for example, a motor) different from the engine 1, or a drive unit for movement in a moving body (for example, a wheel in a vehicle and a propeller in a flying body). The generator may be mounted on at least one of a plurality of the output units, and for example, the generator may be mounted on a most optimal output unit among the plurality of output units in consideration of the layout at a mounting location on which the engine 1 is mounted. Furthermore, the driven devices may not be connected to all the plurality of output units depending on a mounting location on which the engine 1 is mounted as a power source. In this case, a cover member that covers the output unit to which the driven device is not connected may be provided. The cover member prevents the rotating output unit from coming into contact with surrounding members, and prevents an external load from being input to the rotational drive of the engine 1 itself via the output unit. The cover member is preferably configured to be attached to any output unit depending on convenience of a mounting location and so on. Note that the front case 8 in the present embodiment may have the same structure and shape as those of the cover member.

Figure 3:
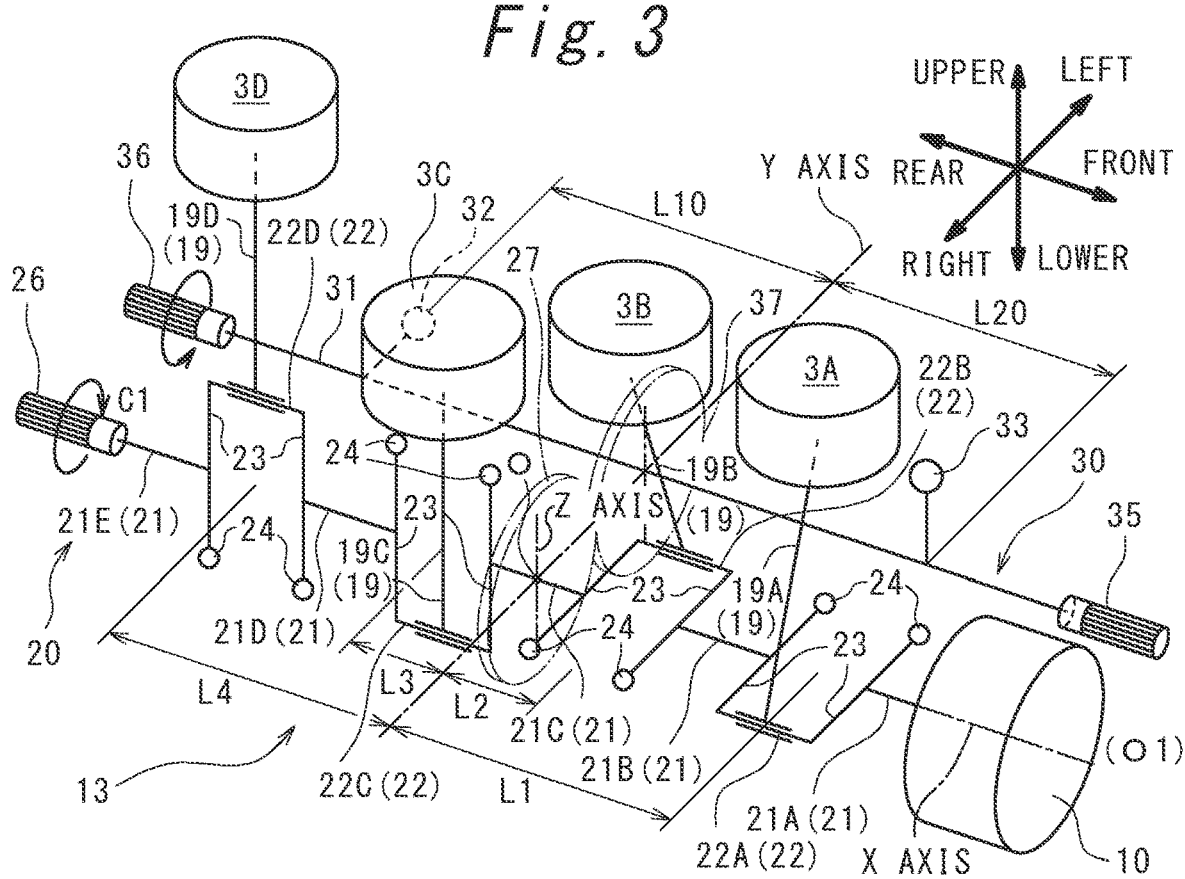
FIG. 3 is a diagram schematically illustrating a crankshaft and a balancer shaft.

FIG. 3 is a perspective view schematically illustrating a main motion system 13 of the engine 1. In this specification, the main motion system 13 of the engine 1 includes first to fourth pistons 3A to 3D and first to fourth connecting rods 19A to 19D in addition to the crankshaft 20 and the balancer shaft 30.

The crankshaft 20 includes first to fifth crank journals 21A to 21E, first to fourth crank pins 22A to 22D, a crank web 23, and a crank counterweight 24. Note that, in the following description, in a case where the first to fourth pistons 3A to 3D, the first to fourth connecting rods 19A to 19D, the first to fifth crank journals 21A to 21E, and the first to fourth crank pins 22A to 22D are not distinguished from one another, they may be simply referred to as the piston 3, the connecting rod 19, the crank journal 21, and the crank pin 22, respectively.

The first to fifth crank journals 21A to 21E are sequentially spaced apart from the front concentrically with the central axis O1, and are rotatably supported by the crankcase 5. The first to fourth crank pins 22A to 22D are located between the first to fifth crank journals 21A to 21E in the front-and-rear direction, respectively, and are offset radially outward with respect to the central axis O1.

The crank web 23 connects an end portion on one side in the axial direction of the crank journal 21 and an end portion on the other side in the axial direction of the corresponding crank pin 22 in the radial direction of the central axis O1.

The crank counterweight 24 is connected to the crank web 23, and is located on an opposite side of the corresponding crank pin 22 across the central axis O1 when the main motion system 13 is viewed from the X-axis direction. The crank counterweight 24 is set in shape (centroid position) and weight so as to generate an inertial force in opposite directions that is balanced or reduced with respect to an inertial force generated from the corresponding operating piston 3, connecting rod 19, crank web 23 and crank pin 22 in conjunction with the rotation of the crankshaft 20.

In the present embodiment, when the crankshaft 20 is viewed from the rear and a rotation direction C1 of the crankshaft 20 about the central axis O1 (in this embodiment, counterclockwise when viewed from the rear) is positive, the second crank pin 22B is located at a position having a phase difference of 180°, the third crank pin 22C is located at a position having a phase difference of 270°, and the fourth crank pin 22D is located at a position having a phase difference of 90° with respect to the first crank pin 22A.

That is, in the crankshaft 20, since the crank pins 22 and the counterweight 24 are located at phases different by 90° from each other, the crankshaft is a completely balanced body in which centrifugal forces due to the respective rotations cancel each other. On the other hand, in the crankshaft 20, an unbalanced couple around the Y axis is generated due to an inertial force due to a reciprocating operation of the piston 3, so that couple vibration may occur. Therefore, in the present embodiment, the balancer shaft 30 is configured to reduce or cancel the couple vibration. The reduction of the couple vibration by the balancer shaft 30 will be described later.

Each of the first to fourth connecting rods 19A to 19D is rotatably connected to each of the first to fourth pistons 3A to 3D at an upper end, and is rotatably connected to each of the first to fourth crank pins 22A to 22D at a lower end.

Figure 4:
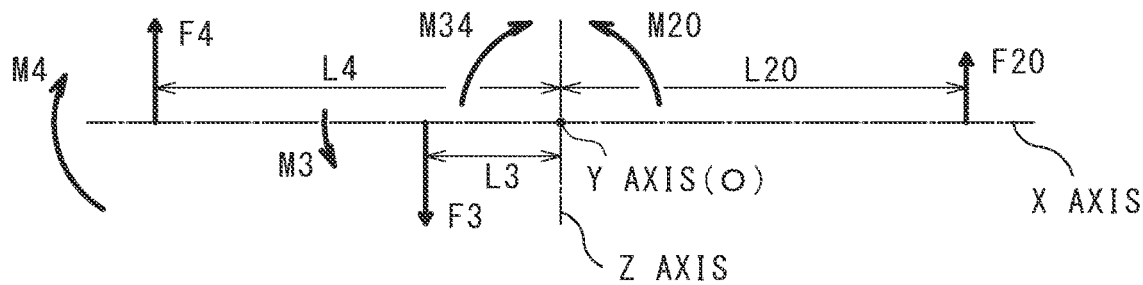
FIG. 4 is a view schematically illustrating couple vibration caused by a third piston and a fourth piston.
Figure 5:
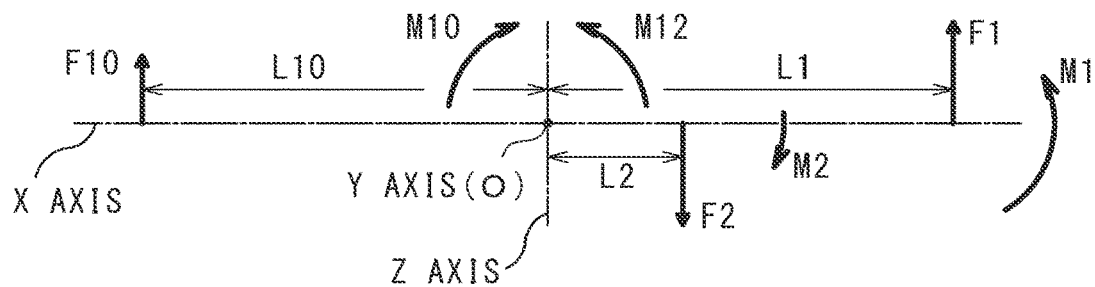
FIG. 5 is a diagram schematically illustrating couple vibration by a first piston and a second piston.

With reference also to FIGS. 4 and 5, the couple vibration due to the unbalanced couple around the Y axis of the crankshaft 20 will be described. FIG. 4 illustrates inertial forces at the third crank pin 22C and the fourth crank pin 22D in the state of FIG. 3.

Since a center position of the third crank pin 22C in the axial direction is located away from the Y axis by a distance L3 in the X-axis direction, and the corresponding third piston 3C is located at a bottom dead center, a downward inertial force F3 is generated. On the other hand, since a center position of the fourth crank pin 22D in the axial direction is located away from the Y axis by a distance L4 in the X-axis direction and the corresponding fourth piston 3D is located at a top dead center, an upward inertial force F4 is generated.

Considering a rotational moment around the Y axis, a rotational moment M3 calculated by multiplying the distance L3 by the inertial force F3 is generated in the third crank pin 22C in a counterclockwise direction, while a rotational moment M4 calculated by multiplying the distance L4 by the inertial force F4 is generated in the fourth crank pin 22D in a clockwise direction. Since the distance L4 is longer than the distance L3, the rotational moment M4 is larger than the rotational moment M3. Therefore, in the state of FIG. 3, a rotational moment M34 clockwise around the Y axis is generated on the crankshaft 20 by a difference between the rotational moments M4 and M3.

Furthermore, although not illustrated, in a state in which a phase is changed by 180° from the state of FIG. 3, that is, in a state in which the third piston 3C is located at the top dead center and the fourth piston 3D is located at the bottom dead center, a rotational moment M34' having the same magnitude as the rotational moment M34 is generated in the crankshaft 20 in the counterclockwise direction. That is, with the reciprocation of the third piston 3C and the fourth piston 3D, an unbalanced couple around the Y axis generated in the third crank pin 22C and the fourth crank pin 22D is generated in the crankshaft 20, and as a result, couple vibration is generated by the rotational moments M34 and M34' around the Y axis.

On the other hand, FIG. 5 illustrates inertial forces of the first crank pin 22A and the second crank pin 22B when the crankshaft 20 rotates by 90° with respect to the state of FIG. 3, the first piston 3A is located at the top dead center, and the second piston 3B is located at the bottom dead center.

Since a center position of the first crank pin 22A in the axial direction is located away from the Y axis by a distance L1 in the X-axis direction, and the corresponding first piston 3A is located at the top dead center as described above, an upward inertial force F1 is generated. On the other hand, since a center position of the second crank pin 22B in the axial direction is located away from the Y axis by a distance L2 in the X-axis direction, and the corresponding second piston 3B is located at the bottom dead center as described above, a downward inertial force F2 is generated.

Considering a rotational moment around the Y axis, a rotational moment M1 calculated by multiplying the distance L1 by the inertial force F1 is generated in the counterclockwise direction in the first crank pin 22A, while a rotational moment M2 calculated by multiplying the distance L2 by the inertial force F2 is generated in the clockwise direction in the second crank pin 22B. Since the distance L1 is longer than the distance L2, the rotational moment M1 is larger than the rotational moment M2. Therefore, in the crankshaft 20, a counterclockwise rotational moment M12 is generated around the Y axis by a difference between the rotational moments M1 and M2.

Similarly, in a state where the first piston 3A is located at the bottom dead center and the second piston 3B is located at the top dead center, a rotational moment M12' having the same magnitude as the rotational moment M12 is generated in a counterclockwise direction in the crankshaft 20. That is, with the reciprocation of the first piston 3A and the second piston 3B, an unbalanced couple around the Y axis generated in the first crank pin 22A and the second crank pin 22B is generated in the crankshaft 20, and as a result, couple vibration is generated by the rotational moments M12 and M12' around the Y axis.

Returning to FIG. 3, the balancer shaft 30 includes a shaft portion 31 that connects the front protruding end portion 35 and the rear protruding end portion 36 in the front-and-rear direction, a balancer first counterweight 32, and a balancer second counterweight 33. The balancer first counterweight 32 is configured to cancel the rotational moments M12 and M12' on the crankshaft 20. Similarly, the balancer second counterweight 33 is configured to cancel the rotational moments M34 and M34' on the crankshaft 20. That is, the balancer first counterweight 32 and the balancer second counterweight 33 generate couple of force corresponding to the unbalanced couple around the Y axis generated in the crankshaft, and the couple vibration due to the unbalanced couple is suppressed as the entire engine 1.

The balancer first counterweight 32 will be specifically described. The balancer first counterweight 32 is provided so as to generate a rotational moment in a direction opposite to the rotational moment M1 at the first crank pin 22A that is farther from the origin O among the first crank pin 22A and the second crank pin 22B of the crankshaft 20. More specifically, the balancer first counterweight 32 is provided on a side (that is, the rear side) opposite to the first crank pin 22A from the Y axis such that a phase in a circumferential direction of the shaft portion 31 becomes the same as a phase of the first crank pin 22A when the first piston 3A is located at the top dead center and the bottom dead center.

Referring also to FIG. 5, the weight of the balancer first counterweight 32 is set such that a rotational moment M10 around the Y axis calculated by multiplying a centrifugal force F10 generated by rotation by a distance L10 in the front-and-rear direction from the Y axis is balanced with the rotational moment M12. As a result, the counterclockwise rotational moment M12 generated in the crankshaft 20 is canceled by the clockwise rotational moment M10 due to the balancer first counterweight 32.

When the first piston 3A is located at the bottom dead center, a counterclockwise rotational moment M10' around the Y axis is generated on the balancer shaft 30 by the balancer first counterweight 32. Therefore, the clockwise rotational moment M12' around the Y axis generated in the crankshaft 20 is canceled by the counterclockwise rotational moment M10' by the balancer first counterweight 32.

Next, the balancer second counterweight 33 will be specifically described. The balancer second counterweight 33 is provided so as to generate a rotational moment in a direction opposite to the rotational moment M4 at the fourth crank pin 22D farther from the origin O among the third crank pin 22C and the fourth crank pin 22D of the crankshaft 20. More specifically, the balancer second counterweight 33 is provided so that the phase of the shaft portion 31 in the circumferential direction becomes the same as a phase of the fourth crank pin 22D when the fourth piston 3D is located at the top dead center and the bottom dead center on a side (that is, the front side) opposite to the fourth crank pin 22D from the Y axis.

The weight of the balancer second counterweight 33 is set such that a rotational moment M20 around the Y axis calculated by multiplying a centrifugal force F20 generated by rotation by a distance L20 in the front-and-rear direction from the Y axis is balanced with the rotational moment M34. As a result, the rotational moment M34 generated in the crankshaft 20 is canceled by the counterclockwise rotational moment M20 by the balancer second counterweight 33.

When the fourth piston 3D is located at the bottom dead center, a clockwise rotational moment M20' around the Y axis is generated on the balancer shaft 30 by the balancer second counterweight 33. Therefore, the counterclockwise rotational moment M34' around the Y axis generated in the crankshaft 20 is canceled by the clockwise rotational moment M20' by the balancer second counterweight 33.

Therefore, while the crankshaft 20 in the in-line four-cylinder engine 1 is configured as a perfect balance body with respect to rotation, the couple vibration around the Y axis that may occur as a result is canceled by the balancer shaft 30.

Furthermore, in the engine 1, the timing at which each of the four pistons 3 is located at the top dead center (or the bottom dead center) occurs in the phase of every 90°. Therefore, in a flat crank in which the crank pin is provided with the phase difference of 180°, the vibration in the rotation secondary of the crankshaft due to the timing at which each of the four pistons is located at the top dead center (or bottom dead center) occurring in the phase every 180° does not occur. Therefore, in the engine 1, the primary vibration and the secondary vibration in the rotation of the crankshaft 20 are suppressed, and the couple vibration is also suppressed.

Figure 6:
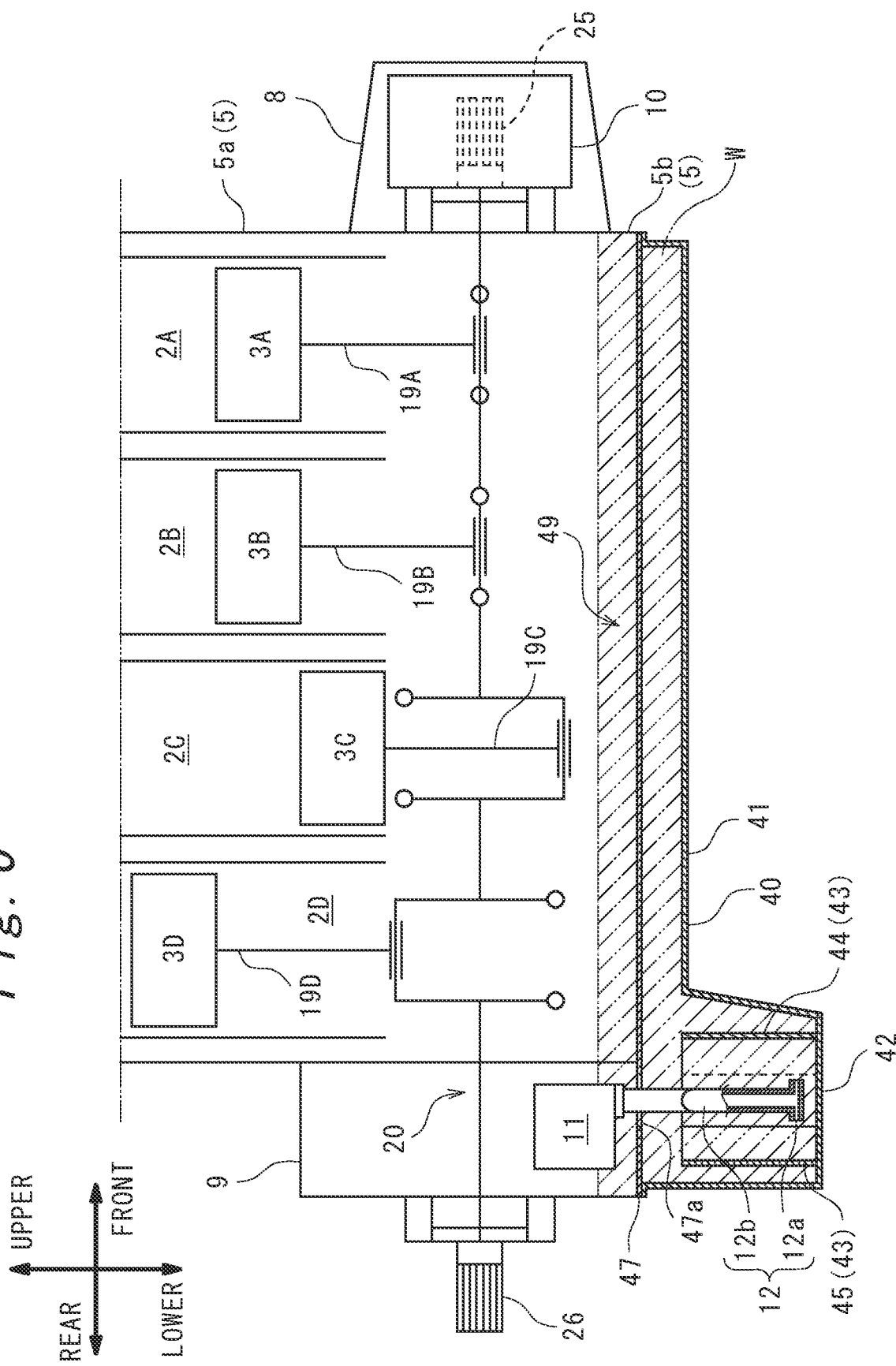
FIG. 6 is a longitudinal sectional view of the engine along an axis of the crankshaft on line VI-VI in FIG. 2.

FIG. 6 is a cross-sectional view taken along line VI-VI in FIG. 2, and illustrates a longitudinal cross-sectional view of the engine taken along the central axis O1 of the crankshaft 20 and the central axis of the cylinder 2. As illustrated in FIG. 6, the oil pan 40 includes a first portion 41 formed in a shallow bottom on the entire surface immediately below the crankcase 5 and the rear case 9, and a second portion 42 recessed further downward from the first portion 41 and formed in a deep bottom. In the present embodiment, the second portion 42 is locally formed at a position corresponding to immediately below the crankshaft 20 in a rear end portion of the first portion, but this position is determined by an arrangement of an oil strainer 12 to be described later, and thus can be appropriately changed depending on the arrangement of the oil strainer 12. For example, in a case where it is assumed that a moving body turns about a turning axis extending in the up-and-down direction when the engine 1 is mounted on the moving body, the second portion 42 of the oil pan 40 is preferably provided at a position away from the turning axis. As a result, oil W can be easily held in the second portion 42 even in a case where a centrifugal force accompanying the turning acts.

An oil chamber 49 in which the oil W is stored is defined inside the crankcase 5 and the oil pan 40. The oil chamber 49 is located below the crankshaft 20 in the engine 1. The oil chamber 49 is provided with a partition plate 47 extending in parallel with the X axis and the Y axis below the crankshaft 20. The partition plate 47 separates a space including the inside of the crankcase 5 and the oil chamber 49 into a side of the crankshaft 20 and an opposite side of the crankshaft 20 (a side of the oil chamber 49). The partition plate 47 prevents movement of the oil W stored in the oil chamber 49 toward the side of the crankshaft 20. As a result, for example, in a case where the engine 1 is mounted on a flying body, even when a rapid change in acceleration in the up-and-down direction, which is difficult to occur in a vehicle or the like moving on the ground, occurs, the oil W can be easily kept in the oil chamber 49 by the partition plate 47. Therefore, the engine 1 is likely to suitably exert the action and effect of the partition plate 47, particularly when the engine 1 is mounted on a flying body.

Note that in the present embodiment, the partition plate 47 is provided below an oil surface of the oil W in the oil chamber 49, and is constituted by an oil pan gasket that is sandwiched between the crankcase 5 and the oil pan 40 to seal therebetween. That is, the partition plate 47 also serves as the oil pan gasket. Note that the partition plate 47 may be provided at a position spaced apart from the oil surface of the oil W in the oil chamber 49 toward the side of the crankshaft 20, or may be configured as a separate component from the oil pan gasket.

Referring also to FIG. 1, the oil strainer 12 is connected to the oil pump 11. The oil strainer 12 has a suction port 12a located at a bottom of the second portion 42 of the oil chamber 49, and a pipe 12b connecting the suction port 12a and the oil pump 11. The oil strainer 12 introduces the oil W sucked from the suction port 12a into the oil pump 11 via the pipe 12b. In the present embodiment, the suction port 12a is opened in the horizontal direction, but is not limited thereto, and may be opened, for example, directly below.

Figure 7:
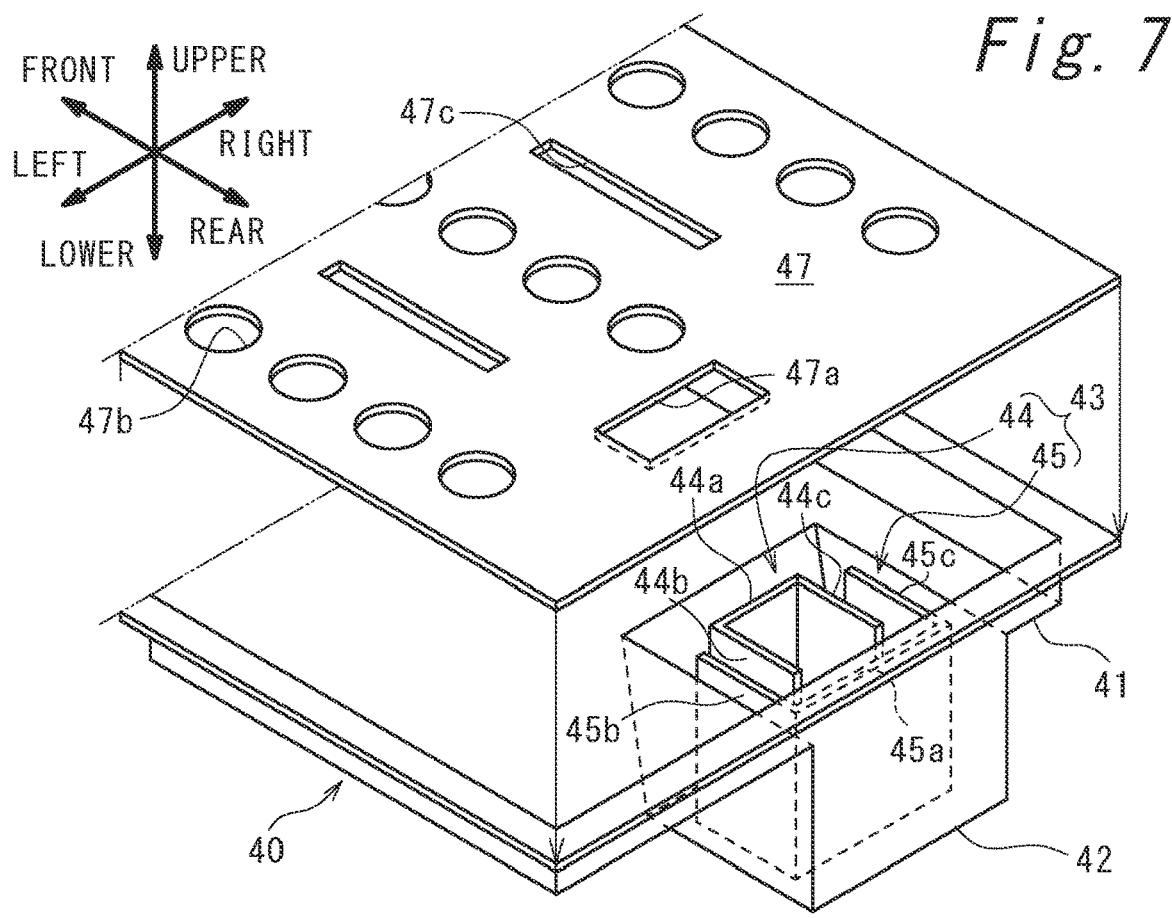
FIG. 7 is a perspective view of a main part of an oil pan and a gasket.
Figure 8:
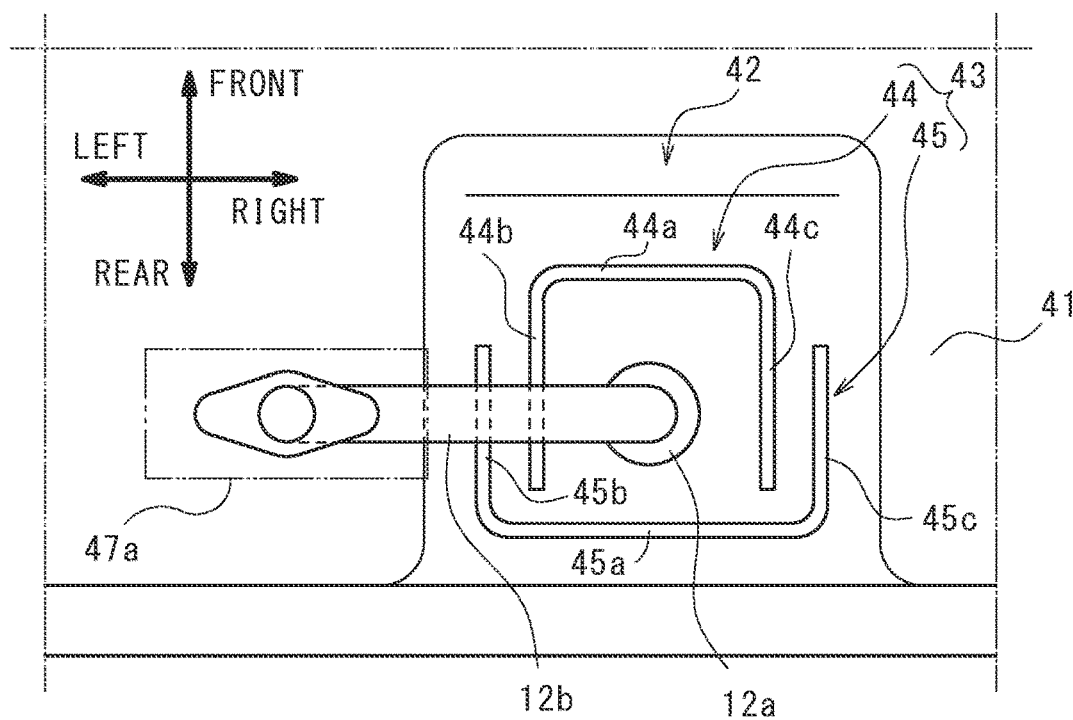
FIG. 8 is a top view of a main part of the oil pan.

FIG. 7 is an enlarged exploded perspective view illustrating the oil pan 40 and the rear periphery of the partition plate 47, and FIG. 8 is a top view thereof. As illustrated in FIG. 7, the partition plate 47 includes a plurality of openings 47a, 47*b*, and 47*c* penetrating in a thickness direction. The oil W in the oil chamber 49 flows from the side of the crankshaft 20 of the partition plate 47 to a side of the oil pan 40 through the openings 47*a*, 47*b*, and 47*c*. Note that the plurality of openings 47*a*, 47*b*, and 47*c* may be formed in the partition plate 47, or only the opening 47*a* may be formed. The partition plate 47 may be configured to cover the second portion 42 from above, in other words, an opening is not formed immediately above the second portion 42, or the number of the opening or an opening area is configured to be small. As a result, it is easy to prevent air from being mixed into the oil W stored in the second portion 42 of the oil pan 40, and it is easy to prevent air biting in the oil strainer 12.

Referring also to FIG. 8, in the oil strainer 12, the pipe 12*b* extends through the opening 47*a*, and crosses the partition plate 47 from the side of the oil pan 40 to the side of the oil pump 11. The second portion 42 of the oil pan 40 is provided with a vertical wall portion 43 extending in the up-and-down direction from a bottom wall portion around the suction port 12*a* of the oil strainer 12. The vertical wall portion 43 includes a first vertical wall portion 44 surrounding the oil strainer 12 from the front side to both side portions in top view, and a second vertical wall portion 45 surrounding the oil strainer 12 from the rear side to both side portions. The first vertical wall portion 44 and the second vertical wall portion 45 preferably extend upward to a bottom surface of the first portion 41 of the oil pan 40, and more preferably extend upward beyond the bottom surface of the first portion 41.

The first vertical wall portion 44 includes a front first vertical wall portion 44*a* positioned in front of the oil strainer 12, and a left first vertical wall portion 44*b* and a right first vertical wall portion 44*c* extending rearward from both side portions of the front first vertical wall portion and facing both side portions of the oil strainer 12, respectively.

The second vertical wall portion 45 includes a rear second vertical wall portion 45*a* positioned behind the oil strainer 12, and a left second vertical wall portion 45*b* and a right second vertical wall portion 45*c* extending forward from both side portions of the rear second vertical wall portion. The left second vertical wall portion 45*b* faces the left first vertical wall portion 44*b* from the left side. The right second vertical wall portion 45*c* faces the right first vertical wall portion 44*c* from the right side. That is, in a top view, the suction port 12*a* of the oil strainer 12 is surrounded from the front side by the first vertical wall portion 44 having a U-shaped cross section opened to the rear side, and from the rear side by the second vertical wall portion 45 having a U-shaped cross section opened to the front side.

In other words, the left second vertical wall portion 45*b* and the left first vertical wall portion 44*b* have portions where the positions in the front-and-rear direction overlap each other. Similarly, the right second vertical wall portion 45*c* and the right first vertical wall portion 44*c* have portions where the positions in the front-and-rear direction overlap with each other. Note that some vertical wall portions constituting the first vertical wall portion 44 and the second vertical wall portion 45 may be configured by wall portions constituting the second portion 42 of the oil pan 40.

According to the engine 1 according to the first embodiment described above, the following effects are exhibited.

(1) Since the plurality of driven devices can be rotationally driven by one engine 1, it is easy to reduce the number of required engines 1. Accordingly, space saving and cost saving can be achieved. Furthermore, since the engine 1 has the plurality of output units, the degree of freedom in arrangement according to the arrangement of the driven devices can be increased.

For example, in order to improve the efficiency or simplify the drive path from the output unit to the driven device, it is easy to perform optimization such that the generator is driven by some of the plurality of output units and mechanical power is extracted from the remaining output units in accordance with the layout of the driven devices at the mounting location on which the engine 1 is mounted. Therefore, since the engine 1 can be used for various applications, versatility can be enhanced.

(2) In addition to the rear protruding end portion 26 of the crankshaft 20, the output units are formed at both the front protruding end portion 35 and the rear protruding end portion 36 of the balancer shaft 30, so that the degree of freedom in the arrangement of the engine 1 according to the driven devices can be further increased.

(3) Since the spline grooves 25*a*, 26*a*, 35*a*, and 36*a* are formed in the front protruding end portion 35 and the rear protruding end portions 26 and 36, respectively, it is possible to easily connect the driven devices to the output units by using spline fitting so that power can be transmitted. Furthermore, the driven devices are easily attached and detached by using the spline.

(4) The generator may be mounted on at least one of the plurality of output units, and for example, the generator can be mounted on the most suitable output unit among the plurality of output units in consideration of the layout at the mounting location on which the engine 1 is mounted, so that versatility of the engine 1 can be improved.

(5) Since the output units can be formed at the front protruding end portion 35 and the rear protruding end portion 36 of the balancer shaft 30, it is not necessary to exclusively provide a shaft constituting the protruding end portions (output units). Therefore, it is possible to suppress an increase in the number of components while configuring the plurality of output units.

(6) The crankshaft 20 is configured as a so-called cross-plane type. As a result, although two sets of the pair of pistons 3 having phases of the crank pins 22 different from each other by 180° are configured, the vibrations due to the reciprocating operation of the pair of pistons 3 are canceled out in each set. Therefore, the primary vibration caused by the inertial force due to the reciprocating operation of the pistons 3 is suppressed.

Furthermore, since the phases of the four crank pins 22 are different by 90°, the four pistons 3 are located at the top dead center with a phase difference of 90°. Therefore, like a so-called flat crank, the two pistons 3 are not simultaneously located at the top dead center and at the same time, the other two pistons 3 are not simultaneously located at the bottom dead center, and the secondary vibration caused by the inertial force due to the reciprocating operation of the pistons 3 is also suppressed. Therefore, it is possible to effectively suppress the primary vibration and the secondary vibration which are likely to cause problems in the four-cylinder engine.

(7) Since the crankshaft 20 is configured as the cross-plane type, primary vibration and secondary vibration in the rotation of the crankshaft 20 caused by the reciprocating motion of the pistons 3 are suppressed, and whereas couple vibration may occur. However, the couple vibration is suppressed by the balancer shaft 30 configured as the couple balancer shaft. Therefore, the vibration of the engine 1 is further reduced.

(8) The partition plate 47 suppresses movement of the oil W in the oil chamber 49 toward the side of the crankcase 5. As a result, even in a case where sudden vibration occurs in the engine 1, it is easy to keep the oil W in the oil chamber 49. For example, in a case where the engine 1 is mounted on a flying body, even when a rapid change in acceleration in the up-and-down direction occurs, it is easy to keep the oil W in the oil chamber 49 and to maintain the supply of the lubricating oil from the oil chamber 49 to the oil pump 11.

(9) Since the partition plate 47 also serves as an oil pan gasket sandwiched between the crankcase 5 and the oil pan 40, an increase in the number of parts can be suppressed.

(10) The partition plate 47 includes the opening 47a penetrating vertically rearward, and the oil strainer 12 includes the pipe 12b passing through the opening 47a and extending vertically across the partition plate 47. Therefore, the oil strainer 12 can be disposed while the partition plate 47 is provided. Furthermore, the oil W that has lubricated each part of the engine 1 and returned to the crankcase 5 can be introduced into the oil chamber 49 through the opening 47a.

(11) The oil pan 40 includes the vertical wall portion 43 extending in the up-and-down direction around the suction port 12a of the oil strainer 12. As a result, even in a case where an acceleration rate changes in the horizontal direction with respect to the engine 1, it is easy to keep the oil W around the suction port 12a of the oil strainer 12 by the vertical wall portion 43. Therefore, it is easy to maintain the supply of the oil W to the oil pump 11.

(12) Since the vertical wall portion 43 extends in the up-and-down direction in front and rear, and on the right and left of the suction port 12a of the oil strainer 12, the vertical wall portion 43 easily holds the oil W around the suction port 12a of the oil strainer 12 even in a case where the change in acceleration in the horizontal direction occurs in any direction, front, rear, left, or right. Accordingly, the supply of the oil W to the oil pump 11 can be further easily maintained.

(13) The vertical wall portion 43 includes a first vertical wall portion 44 that surrounds the suction port 12a of the oil strainer 12 from the front side and both side portions thereof and a second vertical wall portion 45 that surrounds the rear side and both sides thereof. The positions of both side portions 44b and 44c of the first vertical wall portion 44 in the front-and-rear direction at least partially overlap with both side portions 45b and 45c of the second vertical wall portion. As a result, the first vertical wall portion 44 and the second vertical wall portion 45 easily form a labyrinth structure extending from the periphery of the suction port 12a of the oil strainer 12 and from the outer peripheral side to the inside of the vertical wall portion 43, and the oil W is more easily retained around the suction port 12a.

(14) Since the crankshaft 20 and the balancer shaft 30 are configured to extend in parallel with each other, it is not necessary to change the transmission direction using a bevel gear or the like for power transmission from the crankshaft 20 to the balancer shaft 30. Therefore, the engine 1 including the plurality of protruding end portions can be easily made compact.

(15) Since the balancer shaft 30 is configured to be driven by the crankshaft 20, it is possible to directly transmit power from the crankshaft 20 to the balancer shaft 30 without requiring a structure for distributing a driving force to the crankshaft 20 and the balancer shaft 30 inside the engine 1. Therefore, space saving and cost saving of the engine 1 can be easily achieved.

Second Embodiment

Figure 9:
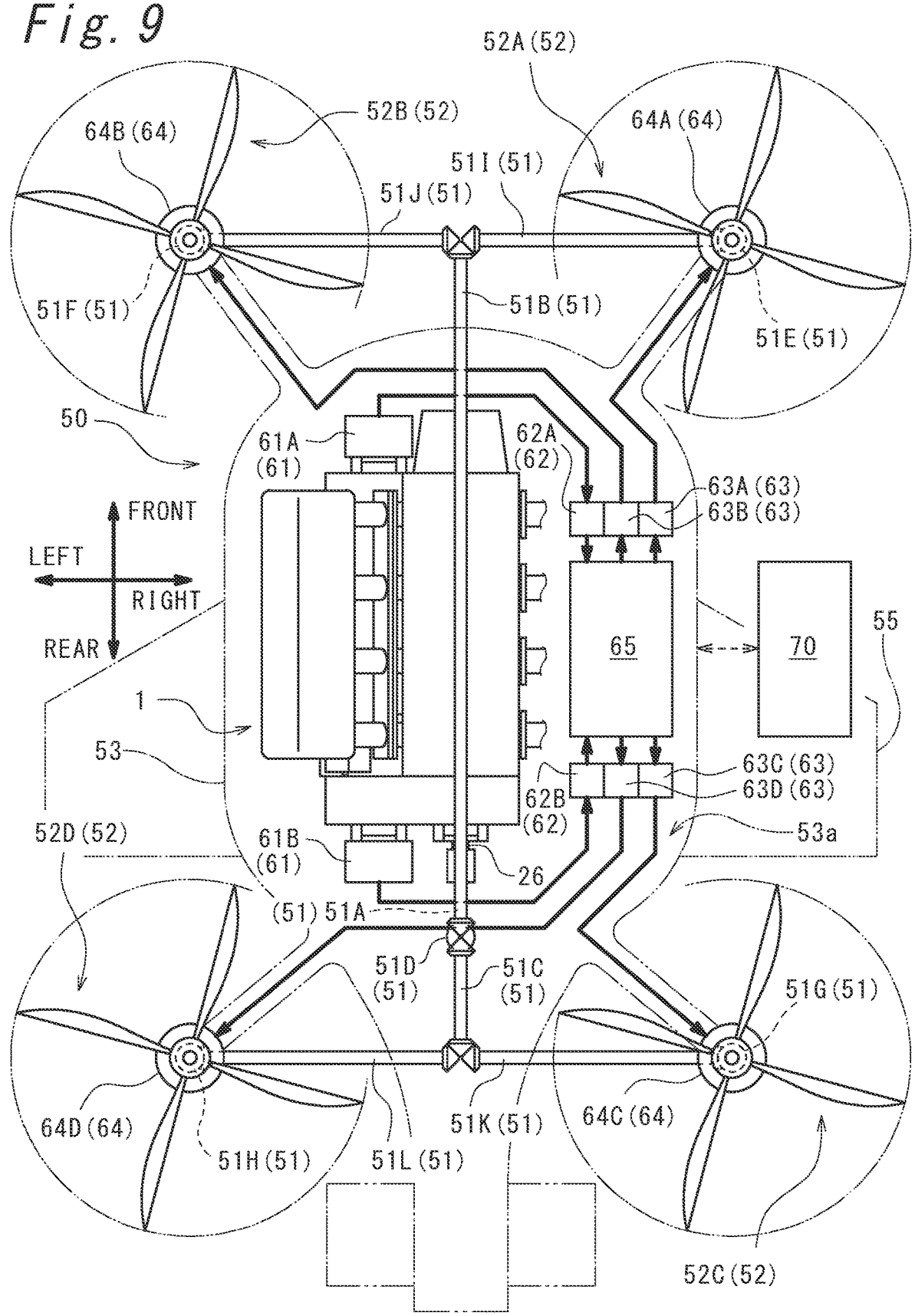
FIG. 9 is a top view illustrating a schematic configuration of a flying body according to a second embodiment of the present disclosure.
Figure 10:
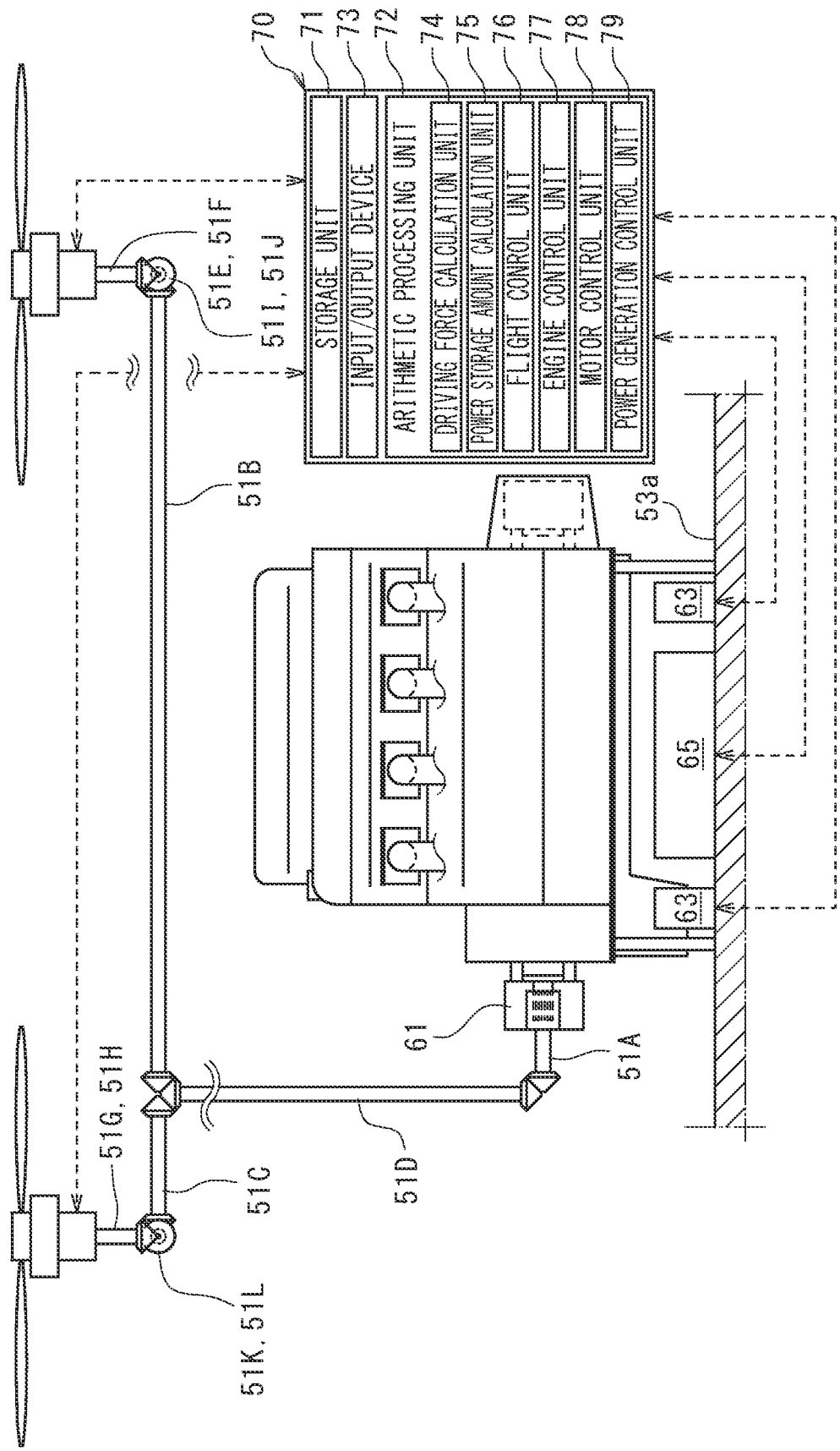
FIG. 10 is a side view of the flying body of FIG. 9.

A moving body according to a second embodiment of the present disclosure will be described with reference to FIGS. 9 to 11. In the present embodiment, the moving body is an unmanned flying body 50 that is remotely operated. As will be described later, an engine 1 is mounted as a power source on the flying body 50. In the following description, a front-and-rear direction of the engine 1 is referred to as a "front-and-rear direction" of the flying body 50 and each component, a left-and-right direction of the engine 1 is referred to as a "left-and-right direction" of the flying body 50 and each component, and an up-and-down direction of the engine 1 is referred to as an "up-and-down direction" of the flying body 50 and each component.

Note that the flying body 50 in the present embodiment includes a pair of right and left fixed wings 55, and a traveling direction of the flying body 50 when performing steady flight (flight that proceeds at a constant speed in one horizontal direction without disturbance, not during takeoff or landing or increasing/decreasing speed, and balanced flight in which lift and gravity to a fuselage are balanced) coincides with the front direction. At least during steady flight, the propulsion generated by a propulsion device of the fuselage has a directional component from the front to the rear of the airframe.

First, a schematic configuration of the flying body 50 will be described with reference to FIGS. 9 and 10. FIG. 9 is a top view of the flying body 50, and FIG. 10 is a side view of flying body 50. A fuselage 53 of the flying body 50 is illustrated by virtual lines in FIG. 9, and only a floor 53a is illustrated in FIG. 10. On the fuselage 53, the engine 1 according to the first embodiment is mounted on the floor 53a, and a plurality of propeller-type rotors 52 are respectively arranged as propulsion device for movements at four corners of the fuselage 53.

The plurality of rotors 52 include a first rotor 52A located on the right front of the fuselage 53, a second rotor 52B located on the left front, a third rotor 52C located on the right rear, and a fourth rotor 52D located on the left rear, and the rotation axes thereof extend substantially in the up-and-down direction.

Furthermore, the flying body 50 is provided with a plurality of motors 64 (electric motors) for rotationally driving the respective rotors 52. Each of the rotors 52 is connected to an output shaft of each of the motors 64, and is configured to be rotatable by the motor 64. Furthermore, each of the rotors 52 is also connected to a drive shaft 51 to be described later, and is configured to be rotatably driven by the drive shaft 51. In the present embodiment, each of the rotors 52 is mainly rotationally driven by the drive shaft 51, and is assisted by the motor 64 according to a required drive load. Note that each of the rotors 52 may be configured to be rotatably driven by at least one or both of the motor 64 and the drive shaft 51, or may be mainly rotatably driven by the motor 64 and assisted by the drive shaft 51. Furthermore, each of the rotors 52 may be configured such that power transmission to the drive shaft 51 via a clutch (not illustrated) can be connected and disconnected, or the number of rotations may be changed via a transmission. As a result, the rotation speed of each of the rotors 52 can be easily adjusted individually, and further, an assist amount by the motor 64 may be appropriately adjusted. This makes it easy to quickly control the attitude of the flying body 50.

The drive shaft 51 as a driven device is spline-fitted to the rear protruding end portion 26 of the crankshaft 20 of the engine 1. Note that the attitude of the flying body 50 when the oil pan 40 is located immediately below the crankcase 5 is assumed as a horizontal state.

The drive shaft 51 is configured to mechanically rotationally drive each of the rotors 52. The drive shaft 51 includes first to third drive shafts 51A to 51C extending in the front-and-rear direction, fourth to eighth drive shafts 51D to 51H extending in the up-and-down direction, and ninth to twelfth drive shafts 511 to 51L extending in the left-and-right direction. Each of the first to twelfth drive shafts 51A to 51L is connected via a bevel gear, thereby forming a driving force transmission path from the rear protruding end portion 26 to each of the rotors 52.

In the balancer shaft 30 of the engine 1, two rotor driving generators 61 as driven devices are spline-fitted to the front protruding end portion 35 and the rear protruding end portion 36, respectively. Each of the rotor driving generators 61 generates electricity for rotationally driving each of the motors 64. Hereinafter, the rotor driving generator 61 connected to the front protruding end portion 35 is referred to as a first rotor driving generator 61A, and the rotor driving generator 61 connected to the rear protruding end portion 36 is referred to as a second rotor driving generator 61B.

On the floor 53a of the fuselage 53, a generator inverter 62, a motor inverter 63, and a power storage device 65 are further disposed. The generator inverter 62 converts an alternating current generated by the rotor driving generator 61 into a direct current. The generator inverter 62 includes a first inverter 62A connected to the first rotor driving generator 61A and a second inverter 62B connected to the second rotor driving generator 61B.

The generator inverter 62 is also connected to the power storage device 65, and the direct current converted by the generator inverter 62 is output to and stored in the power storage device 65. An arbitrary storage battery can be adopted as the power storage device 65, and for example, a capacitor can be adopted in addition to a battery such as a lead storage battery and a lithium ion rechargeable battery. Note that, by configuring the power storage device 65 by a capacitor, a large current can be instantaneously discharged from the power storage device 65 as compared with a battery.

Note that, in the present embodiment, each of the rotors 52 is mechanically driven to rotate by power transmission via the drive shaft 51 and is electrically driven to rotate by the motor 64. Note that one or more of the rotors 52 may be configured as a first drive unit for movement that is rotationally driven via the drive shaft 51, and the remaining one or more may be configured as a second drive unit for movement that is electrically rotationally driven by the motor 64.

The motor inverter 63 is connected to the power storage device 65 and converts a direct current input from the power storage device 65 into an alternating current. The motor inverter 63 is also connected to the motor 64, and the alternating current converted by the motor inverter 63 is output to the motor 64. The motor inverter 63 includes a third inverter 63A connected to a first motor 64A, a fourth inverter 63B connected to a second motor 64B, a fifth inverter 63C connected to a third motor 64C, and a sixth inverter 63D connected to a fourth motor 64D.

Furthermore, the flying body 50 further includes a controller 70. As illustrated in FIG. 10, the controller 70 includes a known computer including a storage unit 71 such as a hard disk, an arithmetic processing unit (CPU) 72, a memory, and an input/output device 73, and software installed in the computer.

The arithmetic processing unit 72 includes a driving force calculation unit 74 that calculates a necessary driving force in each of the rotors 52, a power storage amount calculation unit 75 that calculates a power storage amount by the power storage device 65, a flight control unit 76 that controls the flight of the flying body 50, an engine control unit 77 that controls the operation of the engine 1, a motor control unit 78 that controls the drive of the motor 64, and a power generation control unit 79 that controls a power generation amount by the rotor driving generator 61.

A flight command of the flying body 50 by remote control is input to the input/output device 73 via radio, for example. The flight command includes data (for example, information on flight altitude, flight speed, turn, flight path, and destination) necessary for the flight of the flying body 50. That is, the flying body 50 in the present embodiment is not assumed to be boarded by a person. However, as a mounting location of the engine 1, a flying body on which a person boards and steers can also be included. Moreover, the flying body 50 may autonomously perform steering using a program and map data stored in advance in the storage unit 71 on the basis of a destination input to the input/output device 73.

The driving force calculation unit 74 calculates the driving force required for each of the rotors 52 based on the flight command input to the input/output device 73.

The power storage amount calculation unit 75 calculates a power storage amount in the power storage device 65 based on an output from a sensor (for example, a current sensor) provided in the power storage device 65.

The flight control unit 76 determines an operation amount (rotation speed, output) of the engine 1, an operation amount (motor driving condition) of each inverter 63, and an operation amount (power generation amount by the rotor driving generator 61) of each inverter 62 based on the driving force required for each of the rotors 52 and the power storage amount in the power storage device 65.

For example, the flight control unit 76 may determine the operation amount of the engine 1 so as to operate the engine 1 at a rated point (rotation speed and load to generate the maximum output). In this case, when the driving torque output from the engine 1 is insufficient with respect to the driving force required for each of the rotors 52, the operation amount of the inverter 63 may be determined to drive the motor 64 so as to compensate for the shortage. On the other hand, when the driving torque output from the engine 1 operated at the rated point exceeds the driving force required for each of the rotors 52, the operation amount of the inverter 62 may be determined such that the rotor driving generator 61 is driven by the exceeding driving force.

The engine control unit 77 controls the operation of the engine 1 based on the operation amount of the engine 1 determined by the flight control unit 76. The motor control unit 78 controls each inverter 63 on the basis of the operation amount of each inverter 63 determined by the flight control unit 76 to control the drive of each motor 64. The power generation control unit 79 controls each inverter 62 based on the operation amount of each inverter 62 determined by the flight control unit 76 to control the power generation amount by each rotor driving generator 61.

Figure 11:
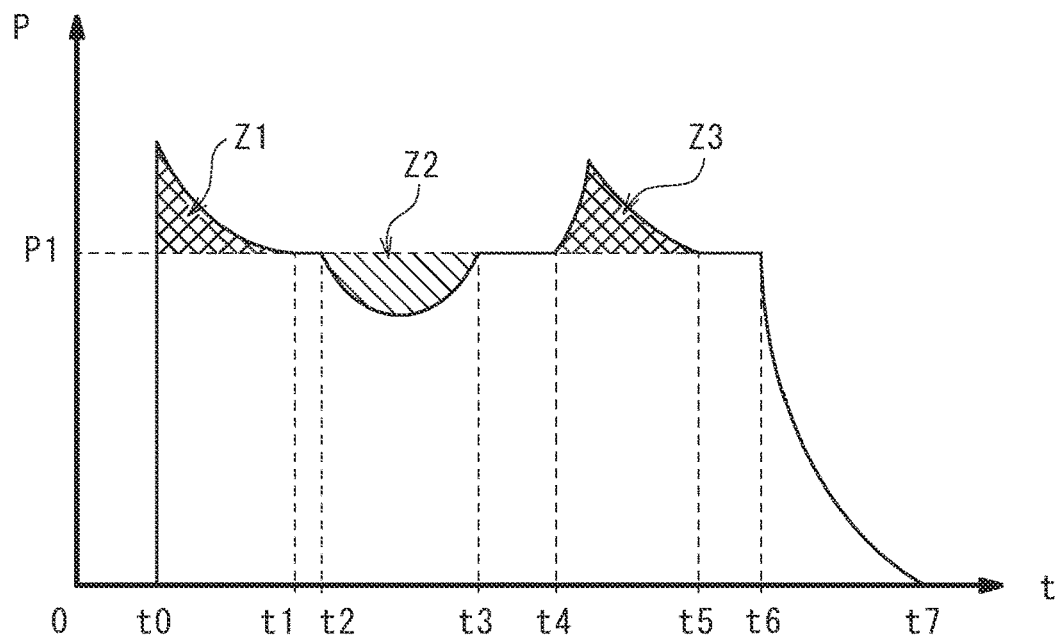
FIG. 11 is a graph schematically illustrating time-series data of an output during flight of the flying body.

With reference to FIG. 11, exemplary operations of the engine 1, the motor 64, and the rotor driving generator 61 in the flight of the flying body 50 controlled by the controller 70 will be described. FIG. 11 is time-series data illustrating a transition of an output P required to rotationally drive the rotor 52.

In FIG. 11, the flying body 50 is taking off at time t0. At this time, while the engine 1 is operated at the rated point and outputs an output P1, the rotor 52 is rotationally driven at an output P exceeding the output P1. Next, as the flying body 50 approaches a predetermined altitude, the output P of the rotor 52 gradually decreases and becomes equal to the output P1 of the engine 1 at time t1 when the flying body reaches the predetermined altitude.

An output range Z1 in which the output P of the rotor 52 exceeds the output P1 of the engine 1 from the time t0 to the time t1 is supplemented by rotationally driving the rotor 52 by the motor 64.

Next, from time t1 to time t2, the flying body 50 stops (also referred to as hovering) at the altitude. At this time, the engine 1 is operated at the rated point. Here, in the present embodiment, the output P of the rotor 52 required to bring the flying body 50 into a stopped state is P1 equal to the rated point output of the engine 1. That is, the output P1 of the engine 1 is balanced with the output P of the rotor 52, and the motor 64 is not operated. Furthermore, the rotor driving generator 61 is not operated.

Next, the flying body 50 is moving in the horizontal direction from time t2 to time t3. At this time, since lift is generated in the fixed wing 55 as the flying body 50 moves, the output P of the rotor 52 is lower than the output P1 for maintaining the stopped state. On the other hand, since the engine 1 is operated at the rated point, a surplus output Z2 is produced by subtracting the output P of the rotor 52 from the output P1. The rotor driving generator 61 is rotationally driven using the surplus output Z2 to generate power. At this time, the motor 64 is not operated.

The flying body 50 stops from time t3 to time t4, and then further ascends from time t4 to time t5. When the flying body 50 ascends, while the engine 1 is operating at the rated point, the output P of the rotor 52 exceeds the output P1 of the engine 1. An output range Z3 in which the output P of the rotor 52 exceeds the output P1 of the engine 1 is supplemented by rotationally driving the rotor 52 by the motor 64. At this time, the rotor driving generator 61 is not operated.

The flying body 50 stops from time t5 to time t6, then starts descending from time t6, and lands at time t7. When the flying body 50 descends, while the output P of the rotor 52 gradually decreases, the output of the engine 1 gradually decreases so as to match the output P of the rotor 52, and no surplus output occurs. Therefore, neither the rotor driving generator 61 nor the motor 64 is in operation at this time.

According to the flying body 50 according to the second embodiment described above, the plurality of rotors 52 can be mechanically rotationally driven from the rear protruding end portion 26 of the plurality of output units included in the engine 1 via the drive shaft 51, and can be rotationally driven by the plurality of motors 64. Therefore, the versatility of a drive source that rotationally drives the rotor 52 can be easily enhanced, and the versatility of the flying body 50 can be enhanced.

In the above embodiment, in the in-line four-cylinder engine 1, the case where the crankshaft 20 is configured as a cross-plane type, and the balancer shaft 30 is provided so as to suppress the couple vibration that may occur due to this has been described as an example, but the present disclosure is not limited thereto.

Figure 12:
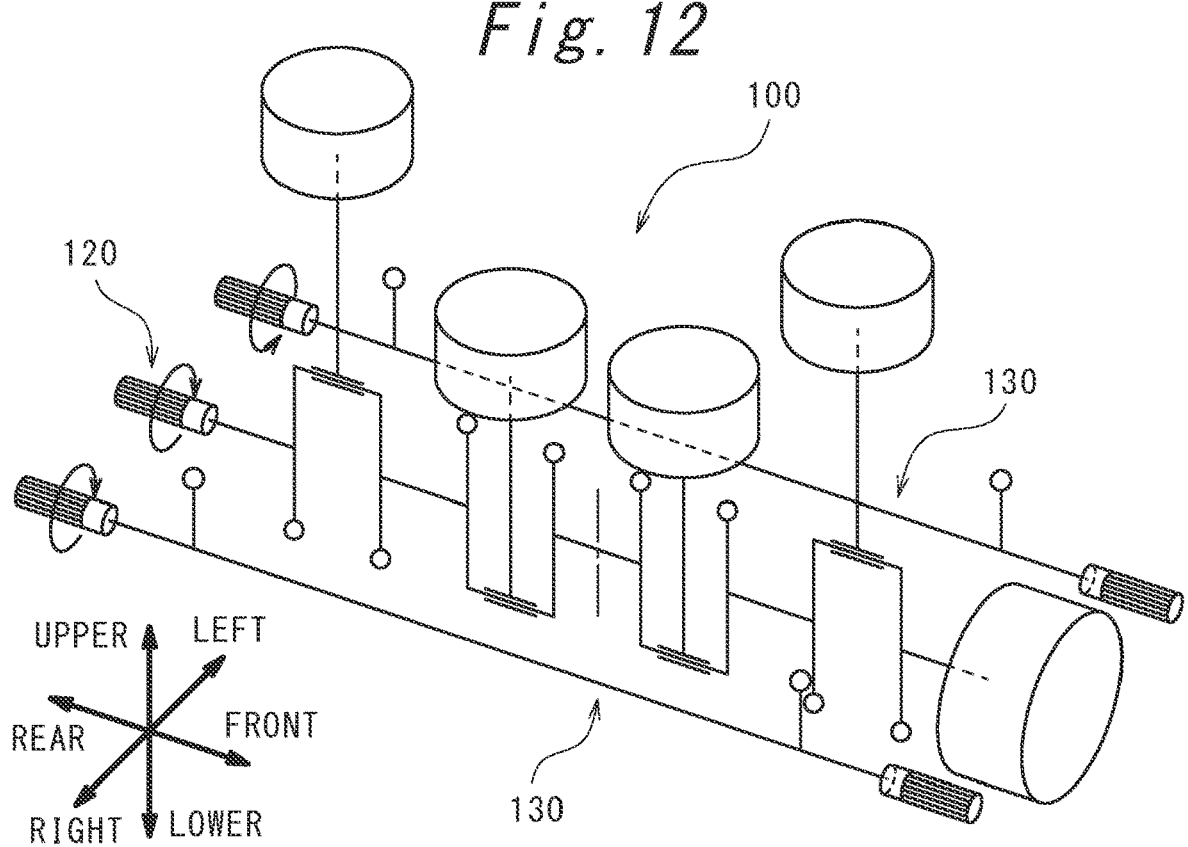
FIG. 12 is a diagram schematically illustrating a crankshaft and a balancer shaft according to a modification example.

For example, as illustrated in FIG. 12, in an in-line four-cylinder engine 100, a crankshaft 120 may be configured as a flat type, and thus the present disclosure may be applied to an engine including a pair of balancer shafts 130 so as to suppress secondary vibration of the crank rotation speed that may occur. In this case, the pair of balancer shafts 130 rotates so as to face each other at twice the rotation speed of the crankshaft 120, and a protruding end portion may be formed at least at one of end portions in the axial direction.

Furthermore, although not illustrated, the protruding end portion is not limited to the balancer shaft, and can be configured as an axial end portion of a shaft member rotationally driven by the crankshaft 20, for example, a drive shaft that rotationally drives the oil pump 11, or a drive shaft constituting the supercharger drive mechanism 14. Furthermore, in addition to the crankshaft 20, the shaft member constituting the protruding end portion does not need to be parallel to the crankshaft 20, and may extend in a direction orthogonal thereto via a bevel gear or the like. In any case, a protruding end portion protruding outward from the crankcase 5 or the rear case 9 may be formed, and an output unit may be formed at the protruding end portion.

Moreover, in a case where the crankshaft 20 and the second shaft rotated by the crankshaft 20 are configured, for example, the second shaft may be accelerated/decelerated so that the rotation transmission from the crankshaft to the second shaft becomes a rotation speed suitable for power generation by the generator 61.

Furthermore, in the above embodiment, the output unit is configured by the spline groove formed in the protruding end portion, but any connection method such as flange connection can be adopted in addition to spline fitting as long as the driven device is mounted. Note that, when the spline fitting is adopted, it is preferable to adopt a configuration in which the dimensions of the spline groove can be commonly used for a plurality of the driven devices. By unifying the spline standard of the output unit, versatility can be enhanced. For example, by connecting a generator to each of a plurality of the output units, it is easy to downsize each generator, and thus, it is easy to suppress the cost of the generator as compared with a case where the same power generation amount is secured by one larger generator. Furthermore, when the connection method of the output unit is spline fitting, it is easy to connect and disconnect the output unit and the device to be connected. For example, in a case where it is necessary to frequently remove the engine 1 from a mounting location device, it is possible to smoothly perform the work by easily connecting and disconnecting the output unit.

Furthermore, in the above embodiment, in the flying body 50, the rotor 52 is configured by both mechanical rotational driving via the drive shaft 51 and rotational driving via the motor 64, but the present disclosure is not limited thereto.

Figure 13:
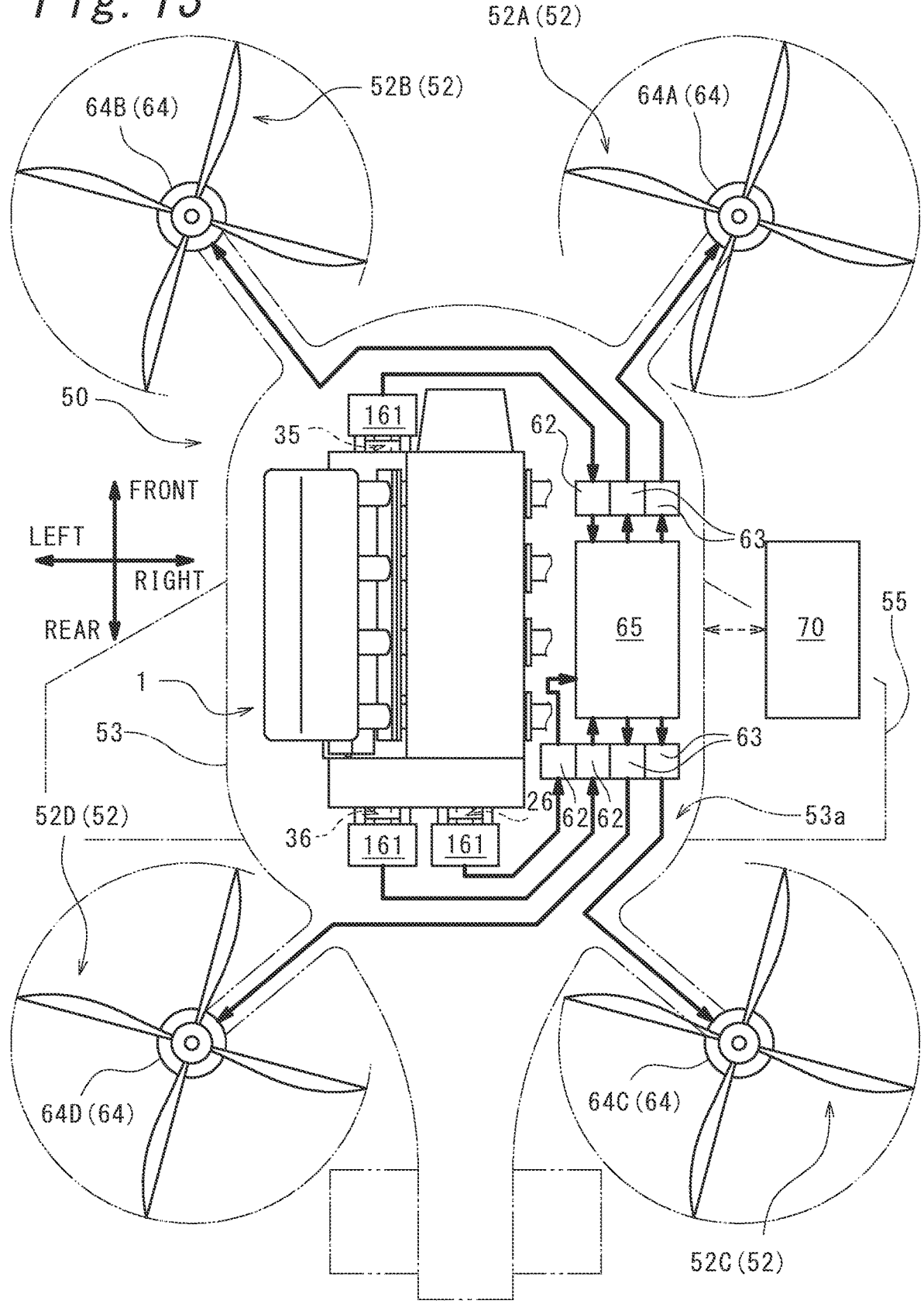
FIG. 13 is a top view illustrating a schematic configuration of the flying body according to the modification example.

For example, as illustrated in FIG. 13, the rotor driving generator 161 may be mounted on each of the front protruding end portion 35 and the rear protruding end portions 26 and 36, and the engine 1 may be used only to drive the rotor driving generator 161 to rotationally drive the rotor 52 via the motor 64.

Furthermore, as illustrated in FIG. 14, the power for mechanically rotationally driving the rotor 52 may be extracted from the front protruding end portion 35 of the balancer shaft 30 in addition to the rear protruding end portion 26 of the crankshaft 20. In this case, the rotor driving generator 61 may be mounted on the rear protruding end portion 36 of the balancer shaft 30. In addition, various driven devices may be mounted on the protruding end portion.

Furthermore, in the above embodiment, the rotor driving generator 61 is configured as a generator that is connected to the protruding end portion of the engine 1 and rotationally driven to generate power, but the present disclosure is not limited thereto. The rotor driving generator 61 may be configured by a motor generator that serves as both a generator and a motor. In a case where the rotor driving generator 61 is operated as a motor, the output of the engine 1 can be increased via the rotor driving generator 61. That is, the rotation of the output unit (the output of the engine 1) can be assisted by the rotor driving generator 61.

The functionality of the elements including the controller 70 disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In the above embodiment, the flying body 50 has been described as an example of the moving body, but the present disclosure is not limited thereto. For example, the present disclosure can also be applied to a moving body that moves on land, on water, and under water.

The present disclosure can be applied to a drone provided with a hybrid engine as the flying body 50. In this case, for example, lift, propulsion, and steering forces may be generated by the single or plurality of rotors 52, or lift may be generated by the fixed wing 55 and propulsion may be generated by the single or plurality of rotors 52, and steering may be performed by the rotors 52 or a rudder.

Furthermore, the present disclosure can also be applied to a so-called compound-heli-type drone having a fixed wing and two types of rotors. In this case, lift is generated at the fixed wing and the first rotor, and propulsion is generated at the second rotor. The steering is performed by the rotors or a rudder.

Moreover, the present disclosure may also be applied to, for example, a straddle type flying body on which a person can board.

The invention claimed is:

1. A power device comprising:
a first shaft;
a second shaft;
a case;
a first output unit;
a second output unit; and
a third output unit,
wherein:
the case rotatably supports the first shaft and the second shaft;
the first shaft has: (i) a first protruding end portion protruding outward from the case at a first end portion in an axial direction; and (ii) a second protruding end portion protruding outward from the case at a second end portion in an axial direction;
the second shaft has a protruding end portion protruding outward from the case at an end portion in an axial direction;
the first output unit is at the first protruding end portion of the first shaft;
the second output unit is at the second protruding end portion of the first shaft;
the third output unit is at the protruding end portion of the second shaft; and
each of the first output unit, the second output unit and the third output unit is capable of rotationally driving a driven device.

2. The power device according to claim 1, wherein a spline is defined in the first output unit, the second output unit or the third output unit.

3. The power device according to claim 1, wherein the power device is for a flyable body.

4. The power device according to claim 1, wherein:
the power device is an internal combustion engine that includes a cylinder, a piston configured to reciprocate in the cylinder, and a connecting rod that connects the piston and one of the first shaft or the second shaft;
the one of the first shaft or the second shaft is a crankshaft; and
the other of the first shaft or the second shaft is a balancer shaft including a counterweight configured to reduce vibration caused by an inertial force due to a reciprocating operation of the piston.

5. The power device according to claim 4, wherein:
the internal combustion engine is a four-cylinder engine including:
four of the cylinders;
four of the pistons configured to reciprocate in the four cylinders, respectively; and
four of the connecting rods connected to the four pistons, respectively;
the crankshaft includes a first crank pin, a second crank pin, a third crank pin, and a fourth crank pin connected to the four connecting rods, respectively; and
the first crank pin, the second crank pin, the third crank pin, and the fourth crank pin are configured to be distributed to positions with phase differences different from each other by 90° around an axial center of the crankshaft.

6. The power device according to claim 5, wherein the balancer shaft is configured to rotate at a same rotation speed as the crankshaft, and is a couple balancer shaft including the counterweight so as to suppress couple vibration caused by the inertial force due to the reciprocating operation of the pistons.

7. The power device according to claim 1, wherein:
one of the first shaft or the second shaft is a crankshaft;
the case is a crankcase; and
the internal combustion engine further includes:
an oil pan below the crankcase, the oil pan defining an oil chamber for storing lubricating oil; and
a partition plate that is located on a side of the oil chamber with respect to the crankshaft in a space including an inside of the crankcase and the oil chamber, and separates the space into a side of the crankshaft and a side opposite to the crankshaft.

8. The power device according to claim 7, wherein the partition plate serves as a gasket sandwiched between the crankcase and the oil pan.

9. The power device according to claim 7, further comprising:
  an oil pump configured to pressurize and discharge the lubricating oil; and
  an oil strainer including a pipe connected to the oil pump and a suction port at a lower end portion of the pipe, the suction port being configured to suck the lubricating oil stored in the oil chamber,
  wherein:
  the partition plate includes an opening penetrating in an up-and-down direction; and
  in the oil strainer, the pipe extends vertically across the partition plate through the opening.

10. The power device according to claim 9, wherein the oil pan includes a vertical wall portion extending in the up-and-down direction around the suction port of the oil strainer.

11. The power device according to claim 10, wherein the vertical wall portion extends in the up-and-down direction in a front and a rear, and on a left and a right of the suction port of the oil strainer.

12. A propulsion device for movement, the propulsion device comprising:
  the power device according to claim 1;
  a drive unit for movement;
  a generator that constitutes the driven device;
  a power storage device configured to store electricity generated by the generator; and
  electric motor configured to be rotationally driven by the electricity generated by the power storage device,
  wherein the drive unit includes: (i) a first drive unit that constitutes the driven device, is configured to be rotationally driven, and is mechanically connected to the first output unit, the second output unit or the third output unit; or (ii) a second drive unit that is configured to be rotationally driven by the electric motor.

13. The propulsion device according to claim 12, wherein the generator is a motor generator and is configured to be able to assist rotation of the first output unit, the second output unit or the third output unit.

14. The power device according to claim 1, further comprising:
  a first generator at the first protruding end portion of the first shaft; and
  a second generator at the second protruding end portion of the first shaft.

15. The power device according to claim 14, wherein the first generator or the second generator is a motor generator.

16. The power device according to claim 1, wherein:
  the first shaft is a balancer shaft.

17. The power device according to claim 1, wherein the first shaft is a balancer shaft; and
  the power device further comprises a first generator at the first protruding end portion of the balancer shaft, and a second generator at the second protruding end portion of the balancer shaft.

18. The power device according to claim 1, wherein:
  the power device is for a flyable body;
  one of the first shaft or the second shaft is a crankshaft; and
  the crankshaft extends in a horizontal direction in a state in which the flyable body is flying.

19. The power device according to claim 1, wherein:
  the power device is for a flyable body;
  the protruding end portion of the second shaft is a first protruding end portion of the second shaft;
  the end portion of the second shaft is a first end portion of the second shaft;
  the second shaft has a second protruding end portion protruding outward from the case at a second end portion in an axial direction;
  one of the protruding end portions of the first and second shafts is for operating an engine;
  another of the protruding end portions of the first and second shafts is for mechanically driving a rotor of the flyable body; and
  two of the protruding end portions of the first and second shafts are for driving two generators.

20. A power device comprising:
  a crankshaft;
  a balancer shaft;
  a case;
  a first output unit; and
  a second output unit,
  wherein:
  the case rotatably supports the crankshaft and the balancer shaft;
  the crankshaft has a protruding end portion protruding horizontally outward from the case at an end portion in an axial direction;
  the balancer shaft has a protruding end portion protruding horizontally outward from the case at an end portion in an axial direction;
  each of the first output unit and the second output unit is capable of rotationally driving a driven device;
  the power device is for a flyable body;
  the crankshaft extends in a horizontal direction;
  the first output unit is at the protruding end portion of the crankshaft; and
  the second output unit is at the protruding end portion of the balancer shaft.

* * * * *